(12) United States Patent
Scherman et al.

(10) Patent No.: US 10,808,776 B2
(45) Date of Patent: *Oct. 20, 2020

(54) TWO SPEED CLUTCH WITH VISCOUS SYSTEM

(71) Applicant: Kit Masters Inc., Perham, MN (US)

(72) Inventors: Dale Scherman, Ottertail, MN (US); Daniel Huwe, Sebeka, MN (US)

(73) Assignee: Kit Masters Inc., Perham, MN (US)

( * ) Notice: Subject to any disclaimer, the term of this patent is extended or adjusted under 35 U.S.C. 154(b) by 361 days.

This patent is subject to a terminal disclaimer.

(21) Appl. No.: 15/818,167

(22) Filed: Nov. 20, 2017

(65) Prior Publication Data

US 2018/0073576 A1    Mar. 15, 2018

Related U.S. Application Data

(63) Continuation of application No. 14/837,478, filed on Aug. 27, 2015, now Pat. No. 9,845,836, which is a
(Continued)

(51) Int. Cl.
*F01P 7/04* (2006.01)
*F16D 35/02* (2006.01)
(Continued)

(52) U.S. Cl.
CPC .............. *F16D 47/06* (2013.01); *F01P 7/042* (2013.01); *F01P 7/085* (2013.01); *F16D 25/062* (2013.01);
(Continued)

(58) Field of Classification Search
CPC ...... F16D 35/02; F16D 35/021; F16D 35/023; F16D 35/024; F16D 25/062;
(Continued)

(56) References Cited

U.S. PATENT DOCUMENTS 2,986,955 A    6/1961    Herbenar
3,536,175 A    10/1970   Kawabe et al.
(Continued)

FOREIGN PATENT DOCUMENTS

WO    2015191325    12/2015

OTHER PUBLICATIONS

International Search Report and Written Opinion for International Application No. PCT/US15/33638 dated Aug. 26, 2015.
(Continued)

*Primary Examiner* — Richard M Lorence
(74) *Attorney, Agent, or Firm* — Gardella Grace P.A.

(57) ABSTRACT

A clutch device for a clutch system has an input member that rotates at a first speed. A friction drive system is disposed between the input member and an output member. The clutch device is selectively movable by a fluid actuator assembly, between an engaged position in which the friction drive system drives the output member to rotate at the first speed, and a disengaged position in which a viscous drive system rotates the output member at a second speed slower than the first speed. A variable viscous fluid supply assembly includes a viscous fluid storage chamber, a valve, and a valve actuator that selectively drives the valve to move between an open position and a closed position to control an amount of viscous fluid available to the viscous drive system, thereby varying the second speed.

20 Claims, 14 Drawing Sheets

Related U.S. Application Data continuation-in-part of application No. 14/299,646, filed on Jun. 9, 2014, now Pat. No. 9,121,461.

(51) Int. Cl.
| | |
|---|---|
| *F16D 47/06* | (2006.01) |
| *F16D 25/062* | (2006.01) |
| *F16D 25/0632* | (2006.01) |
| *F01P 7/08* | (2006.01) |

(52) U.S. Cl.
CPC ....... *F16D 25/0632* (2013.01); *F16D 35/021* (2013.01); *F16D 35/023* (2013.01); *F16D 35/024* (2013.01)

(58) Field of Classification Search
CPC ...... F16D 25/0632; F16D 47/06; F16D 35/00; F16D 35/022; F16D 35/025–35/029; F01P 7/04; F01P 7/042; F01P 7/085
USPC ................................ 192/57, 58.61
See application file for complete search history.

(56) References Cited

U.S. PATENT DOCUMENTS

| | | | |
|---|---|---|---|
| 3,552,532 A | 1/1971 | Thomas | |
| 3,757,914 A | 9/1973 | Elmer | |
| 4,133,417 A * | 1/1979 | Glasson | F16D 35/022 |
| | | | 123/41.12 |
| 4,351,425 A | 9/1982 | Bopp | |
| 4,351,426 A | 9/1982 | Bopp | |
| 4,650,045 A | 3/1987 | Weible et al. | |
| 4,657,126 A | 4/1987 | Hanks et al. | |
| 5,584,371 A * | 12/1996 | Kelledes | F01P 7/042 |
| | | | 123/41.12 |
| 5,816,376 A | 10/1998 | Hatori | |
| 6,032,775 A | 3/2000 | Martin | |
| 6,648,115 B2 * | 11/2003 | Smith | F16D 35/02 |
| | | | 192/21.5 |
| 7,104,382 B2 | 9/2006 | Swanson et al. | |
| 7,318,510 B2 | 1/2008 | Heinle et al. | |
| 7,604,106 B2 | 10/2009 | Swanson et al. | |
| 7,913,825 B2 * | 3/2011 | Boyer | F16D 35/024 |
| | | | 192/58.61 |
| 8,100,239 B2 | 1/2012 | Swanson et al. | |
| 8,109,375 B2 | 2/2012 | Swanson et al. | |
| 8,360,219 B2 | 1/2013 | Swanson | |
| 8,732,947 B2 | 5/2014 | Swanson et al. | |
| 8,863,929 B2 | 10/2014 | Roczniak et al. | |
| 9,121,461 B1 | 9/2015 | Scherman et al. | |
| 9,845,836 B2 * | 12/2017 | Scherman | F01P 7/042 |
| 2011/0180362 A1 | 7/2011 | Swanson | |
| 2012/0164002 A1 | 6/2012 | Roczniak et al. | |
| 2015/0369306 A1 | 12/2015 | Scherman et al. | |

OTHER PUBLICATIONS

Non-Final Office Action for U.S. Appl. No. 14/837,478 dated Feb. 22, 2017.
Non-Final Office Action for U.S. Appl. No. 14/299,646 dated Feb. 6, 2015.
International Preliminary Report on Patentability issued in International Application No. PCT/US2015/033638 dated Dec. 15, 2016.
Notice of Allowance issued in U.S. Appl. No. 14/837,478, dated Aug. 17, 2017.
Notice of Allowance issued in U.S. Appl. No. 14/299,646, dated Jun. 10, 2015.

\* cited by examiner

TWO SPEED CLUTCH WITH VISCOUS SYSTEM

CROSS-REFERENCE TO RELATED APPLICATIONS

This application is a continuation of U.S. application Ser. No. 14/837,478, filed on Aug. 27, 2015, which is a continuation-in-part of and claims priority to U.S. application Ser. No. 14/299,646, filed on Jun. 9, 2014 (now U.S. Pat. No. 9,121,461). All above identified applications are hereby incorporated by reference in their entireties.

BACKGROUND

Vehicle transmission systems, cooling systems, and braking systems may employ clutches or like devices to selectively transmit rotational forces from a drive source to an output member. For example, some cooling systems employ fan clutch systems that control the output rotation of engine cooling fans. A fan clutch may be driven by a drive pulley that rotates in response to the vehicle engine.

In general, a clutch may be operated to engage (or disengage) opposing clutch surfaces, which rotationally interconnect (or rotationally disconnect) a drive pulley and an output member. In an example related to fan clutches, when clutch surfaces are shifted to the engaged position, an output member (carrying fan blades) may be driven to rotate along with a drive pulley. However, when the clutch surfaces are shifted to the disengaged position, the output member is no longer directly urged by the drive pulley.

SUMMARY

Some embodiments of a two-speed clutch system may drive an output member to rotate at a first speed when the clutch surfaces of a friction drive assembly are engaged and to rotate at a second speed when the clutch surfaces are shifted to a disengaged position. In particular embodiments, the two-speed clutch system may employ a viscous drive assembly to cause the output member to rotate even when the clutch surfaces are disengaged. In some embodiments, the viscous drive assembly may be arranged axially forward of the clutch surfaces. Such an arrangement of the viscous drive components advantageously may provide space for heat dissipation structures on a forward portion of the viscous drive assembly. In other embodiments, the viscous drive assembly may be arranged axially rearward of the clutch surfaces. Such an arrangement of the viscous drive components advantageously may provide access to the viscous drive assembly for repair and maintenance purposes.

The two-speed clutch device may be useful, for example, to control the rotation of a cooling fan in a vehicle cooling system, such as a cooling system in a semi-truck, bus, vocational equipment (e.g., garbage truck), or construction equipment vehicle. In such circumstances, the cooling fan may be driven to rotate at a first speed due to rotational interconnection with a drive pulley when the clutch surfaces of the friction drive assembly are engaged and to rotate at a second speed, lower than the first speed, even when the clutch surfaces are disengaged. Thus, the clutch system facilitates the flow of cooling air both when the vehicle cooling system activates the fan (e.g., by causing the clutch surfaces to engage) and when the vehicle cooling system deactivates the fan (e.g., by causing the clutch surfaces to disengage). Accordingly, the vehicle engine may be maintained below a high-temperature threshold for greater periods of time, thereby reducing the number of times and the time duration that the clutch device must be engaged to rotate the fan blades at the first, full speed. As a result, the fuel efficiency of the vehicle may be substantially increased due to the reduction in load upon the engine caused by the full speed rotation of the fan blade device. Additionally, a fan clutch system according to an embodiment may emit less noise when the fan device spins at the second speed than when the fan device spins at the first speed. Furthermore, the reduced engagements may help increase the overall lifespan of the clutch device.

A fan clutch system according to an embodiment may include a drive member that drives an input member of a clutch device to rotate at a first speed about an axis. The clutch device may include a friction ring attached to an output member. The output member may be movable on a piston in the axial direction relative to the input member. A biasing member may be disposed between the input member and the piston to urge the piston toward the input member, thereby moving the clutch device toward an engaged position. When the clutch device is in the engaged position, the friction ring of the output member may frictionally engage with an opposing friction surface of the input member, causing the output member to rotate at the first speed.

The clutch device may include a fluid actuator assembly having a fluid receiving chamber. When the fluid receiving chamber receives a pressurized fluid, the pressurized fluid may urge the piston away from the input member, thereby moving the clutch device toward the disengaged position. When the clutch device is in the disengaged position, the friction ring of the output member may be spaced apart from the opposing friction surface of the input member. An auto-stop sealing device disposed between the piston and the input member may automatically stop the clutch device from moving out of the engaged position when the friction ring has worn down to or below a pre-determined thickness. Thus, the biasing member and the auto-stop seal may cooperate to provide multiple "fail-safe" features, tending to keep the clutch device rotating at the first speed, in the event of a loss of pressure to the fluid actuator assembly, and preventing unacceptable wear in the friction ring.

The clutch device may include a viscous drive assembly that may urge the output member to rotate at a second speed, lower than the first speed, when the clutch device is in the disengaged position. The viscous drive assembly may include a viscous chamber in which a viscous fluid and a resistance member may be disposed. The resistance member may be coupled to rotate with the input member. Thus, even when the clutch is in the disengaged position, the input member may urge the resistance member to rotate at the first speed. The rotation of the resistance member in the viscous chamber may transfer torque through the viscous fluid to the output member, thereby causing the output member to rotate at the second speed.

The clutch device may include a variable viscous system, whereby the second speed may be varied by selectively controlling an amount of the viscous fluid available to the viscous drive system. A variable viscous fluid supply assembly may have a viscous fluid storage container to store viscous fluid not contained in the viscous drive system. A valve disposed between the viscous fluid storage container and the viscous system may control the flow of the fluid between the viscous fluid storage container and the viscous drive system. A valve actuator may control the position of the valve by way of a thermally-activated device. The thermally-activated device may include a bimetal coil attached to a shaft that pivots to move a valve plate in the valve, thereby covering and uncovering one or more openings between the viscous fluid storage container and the viscous drive system. The valve actuator may include an electronic controller programmed to adjust the valve based on input information received from an input device. Accordingly, the valve actuator may determine when and how much to open and close the valve based on computed parameters and information stored in a memory.

A fan clutch system may include a fan blade device attached to the output member such that when the clutch device is in the engaged position, the fan blade device may be driven to rotate at or near the first speed, and when the clutch device is in the disengaged position, the fan blade device may be driven to rotate at the second speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
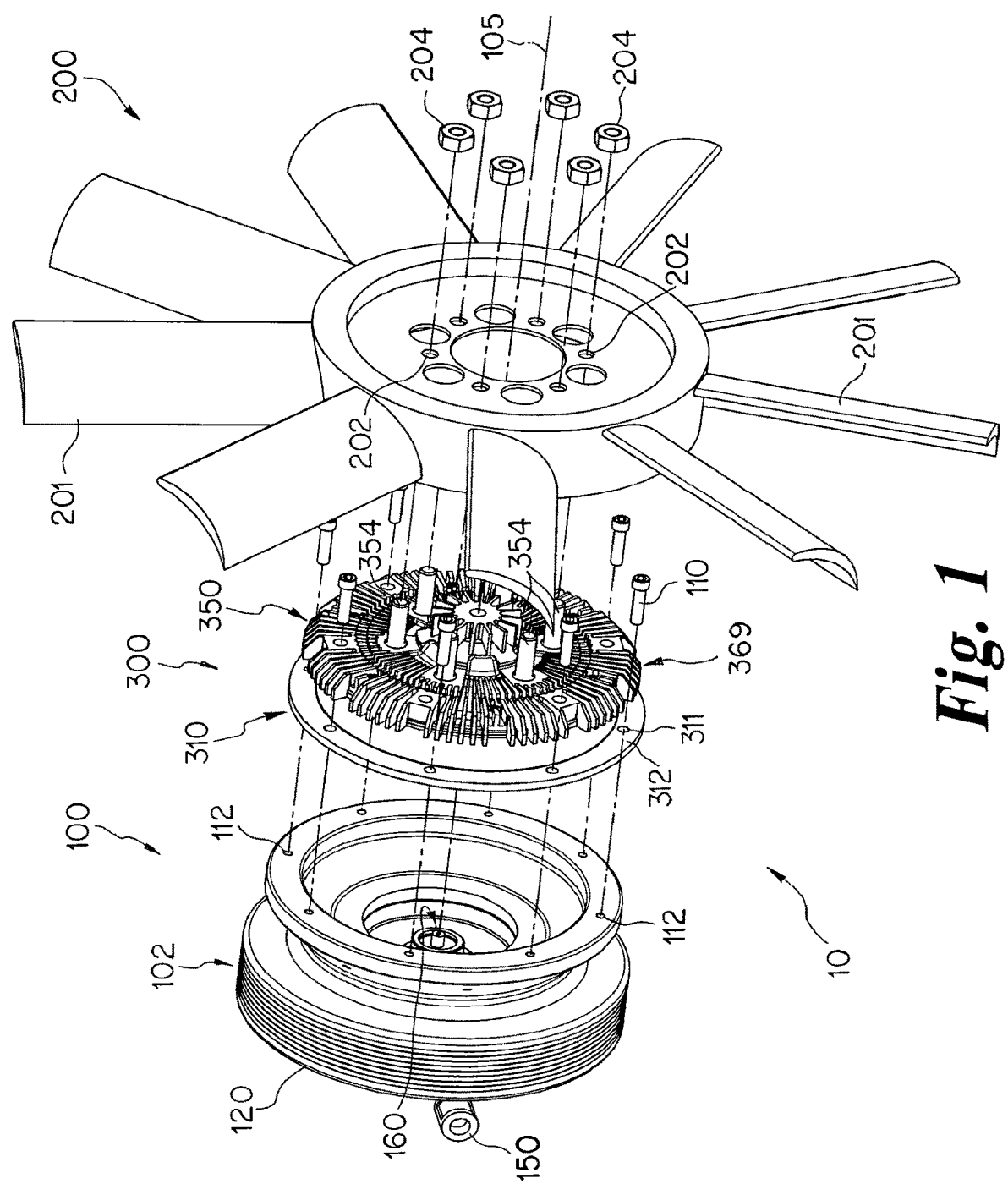
FIG. 1 is an exploded perspective view of a fan clutch system.

Referring now to the drawings, like reference numerals designate identical or corresponding parts throughout the several views.

Referring to FIG. 1, a fan clutch system 10 according to an embodiment may include a drive device 100, a fan blade device 200, and a clutch device 300. The drive device 100 may include a driving member 102 that is driven by a belt, chain, gear, or the like to rotate about an axis 105 on a support member 120. The support member 120 may include a fluid supply input 150 for providing a pressurized fluid from a fluid supply reservoir (not shown). The pressurized fluid may be air, or hydraulic fluid, for example. The support member 120 may be mounted to a structural member of a motor vehicle, for example near a front portion of a semi-truck or toward a rear portion of a bus, to provide engine cooling. The fluid supply input 150 may be connected via a supply channel 152 (shown in FIG. 2) to a fluid supply outlet 160.

Still referring to FIG. 1, an input member 310 of the clutch device 300 may include a drive device mounting portion 312 for coupling the driving member 102 of the drive device 100 to the input member 310. Coupled in this way, when the driving member 102 rotates at a first speed, the input member 310 may rotate with the driving member 102 at the first speed about the axis 105. In an embodiment, the drive device mounting portion 312 may have a flange shape. Two or more bolts 110 may be used to axially mate the drive device mounting portion 312 via two or more through holes 311 to two or more receiving holes 112 in the driving member 102 of the drive device 100. Advantageously, this may greatly reduce the cost and/or effort required when servicing the clutch device 300 or the fan clutch system 10, as compared to other clutches and systems. Specifically, the clutch device 300 may remain essentially intact as a single unit when removed from the drive device 100 of the fan clutch system 10, as in the case of repair or replacement.

Figure 2:
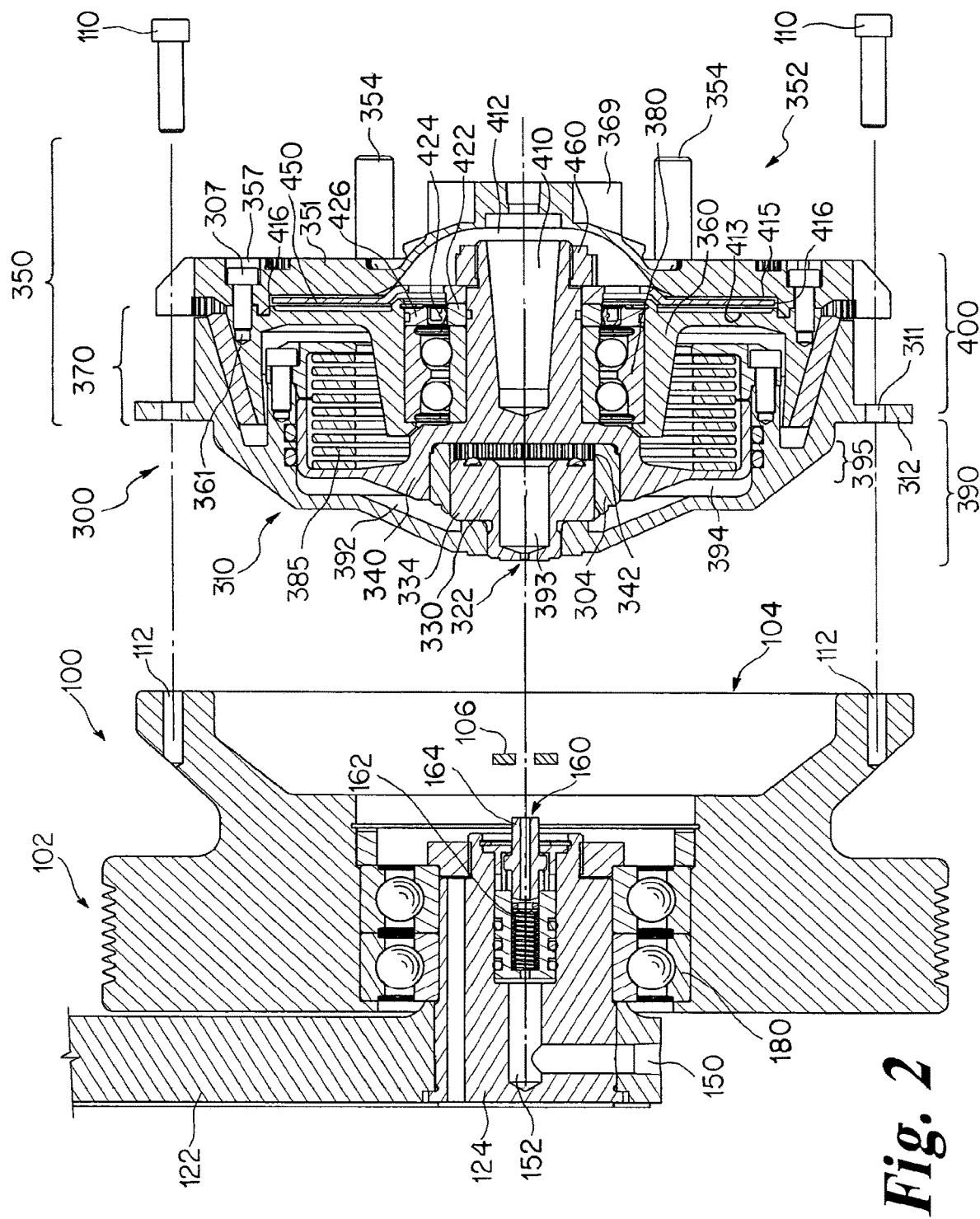
FIG. 2 is a cutaway side view of a drive device in accordance with an embodiment and a clutch device in accordance with an embodiment.

Referring now to FIGS. 1 and 2, an output member 350 may be coupled to the input member 310, for example on a bearing assembly 380 in a manner such that the output member 350 may rotate about the axis 105 relative to the input member 310. The output member 350 may include an output device mounting portion 352. In some embodiments, the output device mounting portion 352 may include two or more mounting studs 354 that protrude from the output member 350. In some embodiments, the output device mounting portion 352 may include threaded holes, snap-fits, or other attachment means for mounting an output device, such as the fan blade device 200, on the output device mounting portion 352. An output device in accordance with one or more embodiments may include any device that operates by rotation, such as a cutting device, a braking device, a wheel-driving device, or a spraying device, for example.

Referring again to FIG. 1, the fan blade device 200 may be coupled to the output member 350 to rotate about the axis 105 with the output member 350. The fan blade device 200 may include two or more mounting holes 202 through which the mounting studs 354 may be inserted. Nuts 204, or other fastening means, may be used to axially clamp the fan blade device 200 onto the mounting studs 354. The fan blade device 200 may include a plurality of fan blades 201 to provide airflow when the fan blade device 200 is rotated.

Still referring to FIG. 1, in some embodiments of the clutch device 300, when the fan blade device 200 spins during engagement, it may produce a thrust component in a direction that may increase the overall frictional engagement force between the input member 310 and the output member 350, which may increase the torque of the output member 350. In selective embodiments, the thrust component from the rotation of the fan blade device 200 during the engagement of the clutch device 300 may depend on the number of fan blades 201, the diameter of the fan blade device 200, and the first speed. For example, in some embodiments, the fan blade device 200 may have from 5 to 11 fan blades 201. In other embodiments, the fan blade device 200 may have fewer than 5 fan blades 201. In still other embodiments, the fan blade device 200 may have greater than 11 fan blades 201. In various embodiments, the diameter of the fan blade device 200 may range from about 20 inches to about 30 inches, about 25 inches to about 35 inches, or about 30 inches to about 40 inches, for example. In an embodiment, the diameter of the fan blade device 200 may be about 36 inches, for example. Increasing the number of fan blades 201, the diameter of the fan blade device 200, or both, may lead to a higher thrust component.

Referring now to FIG. 2, the clutch device 300 may be removably mountable to the drive member 100, as already discussed. In an embodiment, as discussed above, each of the two or more bolts 110 may be passed through one of the two or more through holes 311 and secured in one of the two or more receiving holes 112. Thus, via the drive device mounting portion 312, the input member 310 may be fixed to a forward end 104 of the driving member 102 of the drive device 100. The driving member 102 may rotate on one or more bearings 180 coupled to a shaft portion 124 of the support member 120. The shaft portion 124 may be a separate component from a base portion 122 of the support member 120, as shown in FIG. 2. In other embodiments, the shaft portion 124 may be formed integrally with the base portion 122.

Still referring to FIG. 2, the fluid supply input 150 may be formed in the base portion 122 of the support member 120. The supply channel 152 may be located substantially centrally in the shaft portion 124 to provide fluid communication between the fluid supply input 150 and the fluid supply outlet 160.

While the driving portion 102 may be driven to rotate about the axis 105 at a first speed, the shaft portion 124, and thus the fluid supply outlet 160, may remain substantially stationary. Accordingly, some embodiments of the fluid supply outlet 160 may include an outlet biasing member 162 that urges an outlet nozzle 164 toward the forward end 104 of the driving member 102, thereby ensuring a tight connection between the fluid supply outlet 160 and a fluid inlet portion 322 in a central shaft 320 of the clutch device 300. Some embodiments of the fan clutch system 10 may include a face seal 106 that may be disposed axially between the outlet nozzle 164 and the fluid inlet portion 322. The face seal 106 may be made of a material or combination of materials suitable for acting as a fluid seal, such as an elastomeric material, a plastic, a rubber, or a metal, for example. In some embodiments, the outlet nozzle 164 may rotate at approximately the first speed when the input member 310 is driven to rotate at the first speed. In other embodiments, the outlet nozzle 164 may remain substantially stationary or may rotate at a speed slower than the first speed when the input member 310 is driven to rotate at the first speed.

Figure 3:
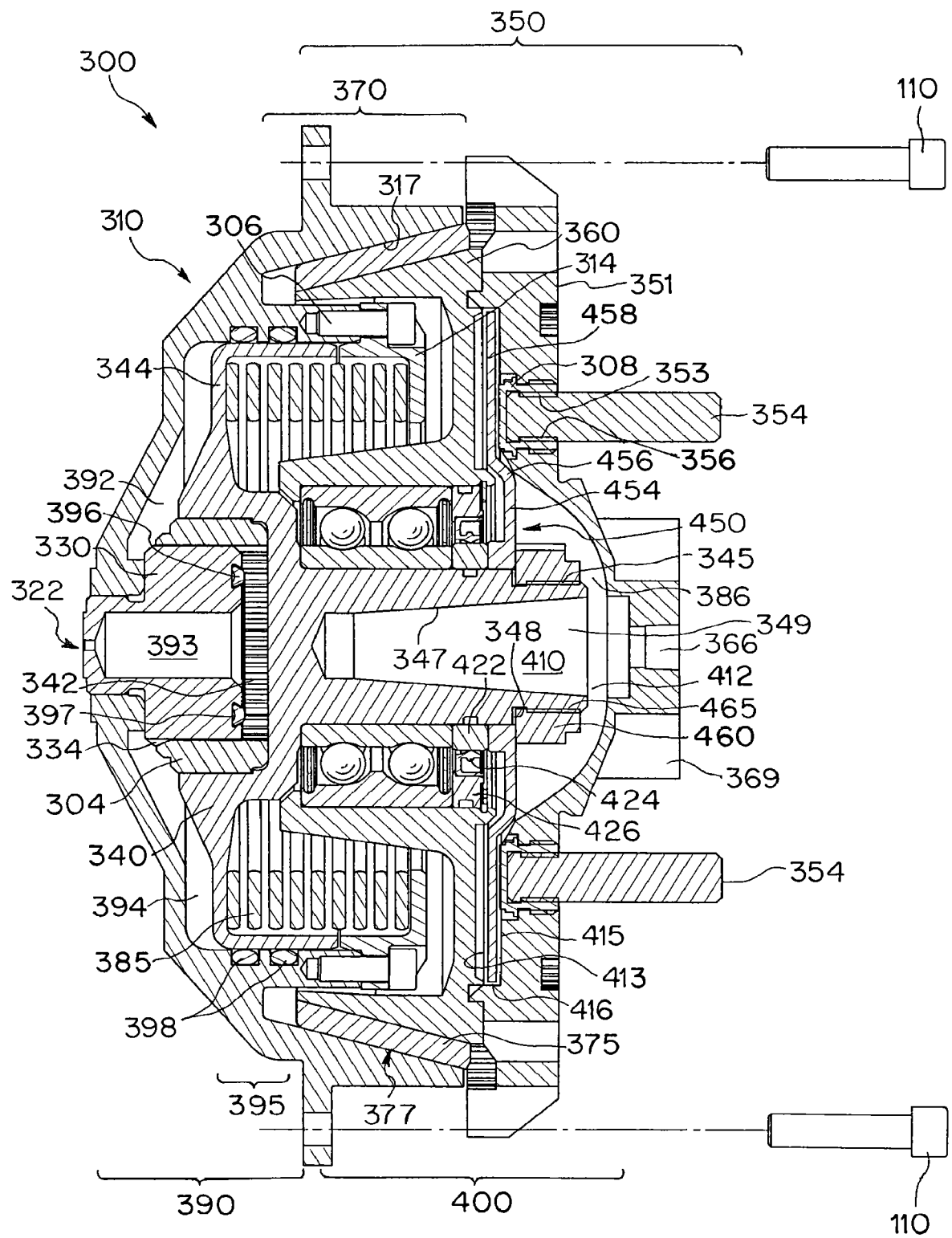
FIG. 3 is a cutaway side view of a clutch device in accordance with an embodiment.
Figure 4:
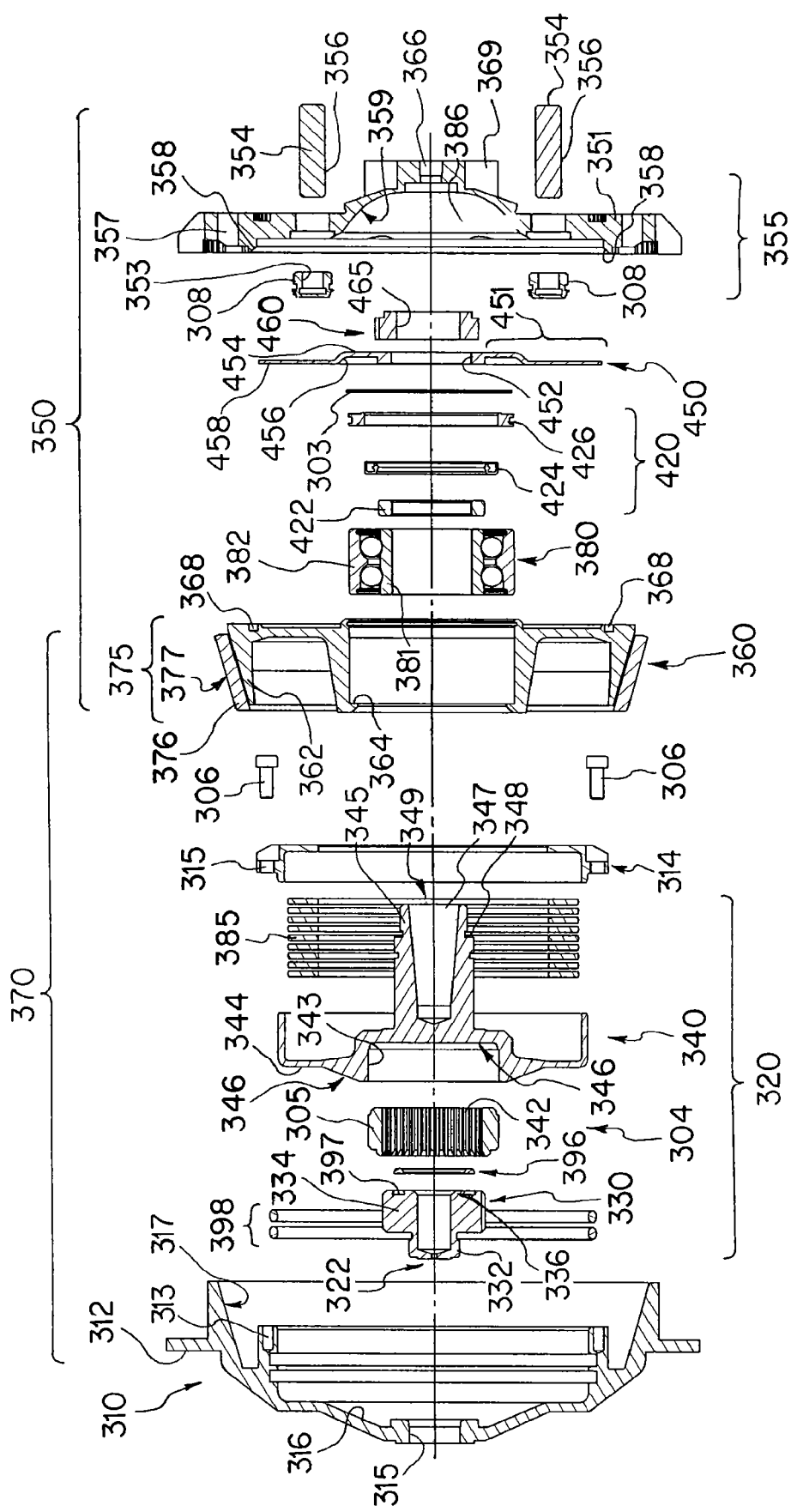
FIG. 4 is an exploded cutaway side view of a clutch device in accordance with an embodiment.

Referring now to FIGS. 2-4, some embodiments of the clutch device 300 may include the input member 310, the central shaft 320, the output member 350, a friction drive assembly 370, a biasing member 385, a fluid actuator assembly 390, and a viscous drive assembly 400. As discussed above, the input member 310 may rotate about the axis 105 at the first speed when driven by the drive device 100 of the fan clutch system 10. The output member 350 may receive an output device, such as a fan blade device 200 of the fan clutch system 10.

In some embodiments, the input member 310 may have an outer diameter of between 4 and 8 inches. In other embodiments, the input member 310 may have an outer diameter of 4 inches or less. In still other embodiments, the input member 310 may have an outer diameter of 8 inches or more. In still other embodiments, the input member 310 may have an outer diameter of between 7 and 9 inches.

Still referring to FIGS. 2-4, the central shaft 320 may include a hub 330 and a piston 340. The hub 330 may be fixed to the input member 310. In some embodiments, the hub 330 may include a threaded portion 332 that engages with a threaded portion 315 of the input member 310. In other embodiments, the hub 330 may be formed integrally with the input member 310.

Still referring to FIGS. 2-4, the piston 340 may be disposed between the hub 330 and the output member 350. The piston 340 may be mounted on the hub 330 so that the piston 340 is able to translate axially relative to the input member 310. In some embodiments, the hub 330 may include an outer splined portion 334 that intermeshes with a corresponding inner splined portion 342 of the piston 340. In some embodiments, the inner splined portion 342 may be formed integrally in the piston 340. In other embodiments, the inner splined portion 342 may be disposed in a spline insert 304. The spline insert 304 may have a threaded portion 305 that engages with a threaded portion 343 of the piston 340. The outer splined portion 334 of the hub 330 and the inner splined portion 342 of the piston 340 each may extend in the axial direction so as to guide the translation of the piston 340 in the axial direction relative to the input member 310.

Still referring to FIGS. 2-4, the output member 350 may include a front plate 351 attached to an intermediate member 360. In some embodiments, one or more screws 307 may extend through one or more through holes 357 in the front plate 351 and into one or more holes 361 in the intermediate member 360. In some embodiments, the front plate 351 may include a ridge 358 that mates with a recess 368 in the intermediate member 360. The ridge 358 and the recess 368 may have corresponding shapes, thereby providing a tight seal.

As already discussed, in some embodiments of the clutch device 300, the device mounting portion 352 may include two or more studs 354 that protrude from the output member 350. In some embodiments, the two or more studs 354 may be attached to the front plate 351. In some embodiments, a stud retaining assembly 355 may attach the two or more studs 354 to the front plate 351. In some embodiments, the stud retaining assembly 355 may include an external threaded portion 356 on each of the two or more studs 354. For each of the two or more studs 354, the external threaded portion 356 may engage with an internal threaded portion 353 in the front plate 351. In some embodiments, the internal threaded portion 353 may be comprised in a stud retainer insert 308 that attaches to the front plate 351 via a rear side 359 of the front plate 351. In various embodiments, the stud retainer insert 308 may attach to the front plate 351 by engagement in a threaded hole, or by other fixing means. Some embodiments of the stud retainer insert 308 may include a sealing portion that prevents or reduces leakage of a viscous fluid from a viscous chamber 410 through the front plate 351. In some embodiments, the sealing portion may be a separate member, such as an o-ring seal, for example. In other embodiments, the sealing portion may be formed integrally in the stud retainer insert 308.

By providing the internal threaded portion 353 in the stud retainer insert 308, the stud retaining assembly 355 may include removable and/or interchangeable parts, thereby making the clutch device less costly to manufacture and easier to repair. In other embodiments, the internal threaded portion 353 may be integral to the front plate 351. In other embodiments, each of the two or more studs 354 may be fastened to a common stud stop plate (not shown) disposed on the rear side 359 of the front plate 351. In still other embodiments, the two or more studs 354 may be formed integrally with the front plate 351.

In some embodiments, the front plate 351 may include one or more heat dissipation portions 369 (shown in FIG. 1). In various embodiments, the one or more heat dissipation portions 369 may include fins protruding away from the front plate 351 and/or grooves extending into the front plate 351. In some embodiments, the one or more heat dissipation portions 369 may be comprised in a heat sink member attached to the output member 350.

Still referring to FIGS. 2-4, the friction drive assembly 370 may include a friction medium 375 disposed between the input member 310 and the output member 350. In some embodiments, as shown in FIGS. 2-4, the friction medium 375 may include a friction ring 376. The friction ring 376 may be fixedly attached to the output member 350, for example, by bolts (not shown), and/or by other attachment means such as an adhesive. In some embodiments, the friction ring 376 may be attached to an outer periphery portion 362 of the intermediate member 360.

In various embodiments, the friction medium 375 may be made of a metal, ceramic, or other material or combination of materials that is capable of providing frictional engagement and is capable of dissipating heat. An engagement surface 377 of the friction ring 376 may have a generally frusto-conical shape. An opposing friction surface 317 of the input member 310 may likewise have a generally frusto-conical shape. Accordingly, the engagement surface 377 and the opposing friction surface 317 may form a frusto-conical friction interface. In an embodiment, a radius of the frusto-conical friction interface may increase as the frusto-conical friction interface extends toward the output device mounting portion 352 of the output member 350. In another embodiment, the radius of the frusto-conical friction interface may decrease as the frusto-conical friction interface extends toward the output device mounting portion 352. The shape and orientation of the friction medium 375 may provide the friction drive assembly 370 with a conical wedging action. This conical wedging action may improve the engagement friction between the engagement surface 377 and the opposing friction surface 317, thereby providing enhanced torque transfer capabilities. In some embodiments, the friction medium 375 and the opposing friction surface 317 may be defined by a substantially flat friction interface.

In some embodiments, the friction ring 376 may have an average diameter of between 3 and 6 inches. In other embodiments, the friction ring 376 may have an average diameter of 3 inches or less. In still other embodiments, the friction ring 376 may have an average diameter of 6 inches or more. In still other embodiments, the friction ring 376 may have an average diameter of between 5 and 7 inches.

Still referring to FIGS. 2-4, the bearing assembly 380 may constrain the output member 350 to translate in the axial direction with the piston 340. The bearing assembly 380 may allow the output member 350 to rotate about the axis 105 relative to the piston 340 and the input member 310. In some embodiments, the bearing assembly 380 may include a single bearing device, such as a ball bearing device, a roller bearing device, or a bushing, for example. In other embodiments, the bearing assembly 380 may include two or more bearing devices or combinations of bearing devices. Advantageously, the clutch device 300 according to some embodiments may require fewer rotational-type bearing devices as compared to other clutch devices.

Still referring to FIGS. 2-4, the biasing member 385 may be disposed between the input member 310 and the piston 340. The biasing member 385 may provide a force on the piston 340 to urge the piston 340 to translate in the axial direction, thereby biasing the friction drive assembly 370 toward an engaged position. In the engaged position, the engagement surface 377 of the friction ring 376 may frictionally engage with the opposing friction surface 317 of the input member 310. When the friction drive assembly 370 is in the engaged position, the input member 310 may transfer torque via the friction medium 375 to the output member 350, thereby driving the output member 350 to rotate with the input member 310 at the first speed. In various embodiments, the biasing member 385 may include a metallic coil spring, an elastomer, a fluidic damper, or a combination of these, for example. In some embodiments, the biasing member may urge the friction drive assembly 370 toward a disengaged position in which the engagement surface 377 is spaced apart from the opposing friction surface 317.

In some embodiments, the bearing assembly 380 may include a retainer ring 303. The retainer ring 303 may retain an outer race 382 of the bearing assembly 380 axially against a shoulder portion 364 of the intermediate member 360, while at the same time leaving the intermediate member 360 substantially free to rotate about the axis 105 relative to the central shaft 320.

Still referring to FIGS. 2-4, the piston 340 may include a spring engaging portion 344. The input member 310 may include a spring retaining member 314. In some embodiments, the spring retaining member 314 may be removably attached to the input member 310, for example, by one or more screws 306 that may extend through one or more holes 315 in the spring retaining member and into one or more holes 313 in the input member 310. In other embodiments, the spring retaining member 314 may be formed integrally with one or more other portions of the input member 310. The biasing member 385 may be disposed between the spring engaging portion 344 and the spring retaining member 314 so that when the spring engaging portion 344 moves axially toward the spring retaining member 314, the biasing member 385 is thereby compressed in length. Conversely, when the biasing member 385 expands in length, the spring engaging portion 344 may move axially away from the spring retaining member 314.

Still referring to FIGS. 2-4, the fluid actuator assembly 390 may selectively oppose the biasing member 385 to urge the friction drive assembly 370 toward one of the engaged position or the disengaged position. Thus, in an embodiment wherein the biasing member 385 biases the friction drive assembly 370 toward the engaged position, the fluid actuator assembly 390 may be activated to overcome the force of the biasing member 385, thereby moving the friction drive assembly 370 toward the disengaged position. Alternatively, in an embodiment wherein the biasing member 385 biases the friction drive assembly 370 toward the disengaged position, the fluid actuator assembly 390 may be activated to overcome the force of the biasing member 385, thereby moving the friction drive assembly 370 to the engaged position.

Still referring to FIGS. 2-4, the fluid actuator assembly 390 may include a fluid receiving chamber 392. In some embodiments, the fluid actuator assembly 390 may be activated by providing the pressurized fluid (as discussed above with respect to the drive device 100) to the fluid inlet portion 322, which may be in fluid communication with the fluid receiving chamber 392. In some embodiments, the input member 310, the hub 330, and the piston 340 may be arranged such that a space between them defines the fluid receiving chamber 392. In some embodiments, the fluid receiving chamber 392 may be defined in part by a front face 316 of the input member 310 and a rear face 346 of the piston 340. One or more seal devices 398 may be disposed between an outer periphery of the spring engaging portion 344 and an inner periphery of the input member 310 to reduce or prevent the pressurized fluid from leaking out of the fluid receiving chamber 392.

In some embodiments, when the fluid receiving chamber 392 receives the pressurized fluid, the pressurized fluid may exert a force on the piston 340, thereby displacing the piston 340 in the axially forward direction against the biasing member 385 and shifting the friction drive assembly 370 into the disengaged position, wherein a gap exists between the engagement surface 377 of the friction ring 376 and the opposing friction surface 317 of the input member 310. When the pressurized fluid is evacuated from the fluid receiving chamber 392, the fluid pressure force on the piston 340 is reduced, and the biasing member 385 urges the piston 340 axially rearward, thereby returning the friction drive assembly 370 to the engaged position.

In some embodiments of a clutch system 10 incorporating a clutch device 300 in accordance with an embodiment, transitions between the engaged position and the disengaged position may be controlled manually. For example, in an embodiment, an operator of a motor vehicle may flip a switch, or press a button, in response to which a valve in a compressed air system (not shown) may release compressed air into the fluid inlet portion 322 via the fluid supply input 150. In other embodiments, transitions between the engaged position and the disengaged position may be controlled automatically. For example, in an embodiment, a thermostatic device may provide the pressurized fluid to the fluid inlet portion 322 when a threshold temperature is met or exceeded.

Still referring to FIGS. 2-4, the fluid receiving chamber 392 may include an inner portion 393 and an outer portion 394, separated in the radial direction by an auto-stop sealing assembly 395. The auto-stop sealing assembly 395 may include a seal body 396 seated in a groove pocket 397 in a forward end 336 of the hub 330 axially opposite the rear face 346 of the piston 340. In an embodiment, when the axial thickness of the friction medium 375 is worn down to, or below, a predetermined threshold thickness, the seal body 396 may engage with the rear face 346 of the piston 340. Thus, the rear face 346 may be a sealing surface against which the seal body 396 forms a fluid seal. In this configuration, the pressurized fluid may not flow from the inner portion 393 of the fluid receiving chamber 392, past the seal body 396 of the auto-stop sealing assembly 395, and into the outer portion 394 of the fluid receiving chamber 392. Thus, the auto-stop sealing assembly 395 may stop the friction drive assembly 370 from moving to the disengaged position. In another embodiment, the auto-stop sealing assembly 395 may stop the friction drive assembly 370 from moving to the engaged position.

In some embodiments, the seal body 396 may have a substantially toroidal shape defined by a cross-section revolved about an axis of revolution. The cross-section of the seal body 396 may include a dovetail shape. In some embodiments, the groove pocket 397 may likewise have a substantially toroidal shape defined by a cross-section revolved about an axis of revolution. The cross-section of the groove pocket 397 may include a dovetail shape to frictionally retain the seal body 396 in the groove pocket 397.

Still referring to FIGS. 2-4, the viscous drive assembly 400 may fluidically couple the input member 310 to the output member 350 so that the output member 350 rotates at a second speed slower than the first speed when the friction drive assembly 370 is in the disengaged position. The viscous drive assembly 400 may include a viscous fluid disposed in the viscous chamber 410 and a resistance member 450 disposed in the viscous chamber 410.

In some embodiments, the resistance member 450 may be coupled to rotate with the input member 310. In some embodiments, the resistance member 450 may be fixed to rotate with the central shaft 320. In some embodiments, the piston 340 may couple the resistance member 450 to rotate with the hub 330, and thereby to rotate with the input member 310. In some embodiments, the resistance member 450 may be axially clamped between an inner race 381 of the bearing 380 and a nut 460. The nut 460 may retain a hub portion 452 of the resistance member 450 axially against the inner race 381 and the inner race 381 axially against a shoulder portion 348 of the piston 340. A threaded portion 465 of the nut 460 may engage with a threaded portion 345 of a forward end portion 349 of the piston 340 to axially clamp the hub portion 452 and the inner race 381 axially against the shoulder portion 348.

In various embodiments, the viscous drive assembly 400 may include a viscous sealing assembly 420. The viscous sealing assembly 420 may prevent or reduce leakage of the viscous fluid from the viscous chamber 410 in the direction of the bearing 380, while also allowing the output member 350 including the intermediate member 360 to rotate on the bearing 380 about the axis 105 relative to the central shaft 320. In some embodiments, the viscous sealing assembly 420 may include a spacer 422, an inner seal body 424, and an outer seal body 426. The spacer 424 may be axially clamped between hub portion 452 and the inner race 381. In various embodiments, the spacer 422 may comprise one or more materials such as an elastomer, plastic, or metal.

In various embodiments, the inner seal body 424 may be disposed radially outward of the spacer 422, between the spacer 422 and the outer seal body 426. In some embodiments, the inner seal body 424 may have a substantially toroidal body, defined by a substantially U-shaped cross-section, opening toward the viscous chamber 410. Accordingly, if the viscous fluid in the viscous chamber 410 exerts a pressure on the inner seal body 424, the inner seal body may be urged to expand radially, thereby sealing against an outer periphery of the spacer 422 and the outer seal body 426. In some embodiments, the inner seal body 424 may be biased to expand radially, thereby sealing against an outer periphery of the spacer 422 and the outer seal body 426. In various embodiments, the inner seal body 424 may be biased by an internal residual stress. In some embodiments, the inner seal body 424 may include an inner sealing lip or ridge, disposed against the outer periphery of the spacer 422. In various embodiments, the inner seal body 424 may comprise one or more materials such as an elastomer, plastic, or metal.

In various embodiments, the outer seal body 426 may be disposed radially outward of the inner seal body 424, between the inner seal body 424 and an inner periphery of the intermediate member 360. In various embodiments, the outer seal body 426 may be disposed in the axial direction between the retainer ring 303 and the outer race 382 of the bearing 380. In some embodiments, the outer seal body 426 may have a substantially toroidal body, defined by a substantially rectangular cross-section. In some embodiments, the outer seal body 426 may include one or more sealing or wiper ridges disposed against the inner periphery of the intermediate member 360. In various embodiments, the outer seal body 426 may comprise one or more materials such as an elastomer, plastic, or metal.

In other embodiments, the spacer 422 and the inner seal body 424 may be formed integrally as a single member. In still other embodiments, the inner seal body 424 and the outer seal body 426 may be formed integrally as a single member. In still other embodiments, the spacer 422, the inner seal body 424, and the outer seal body 426 may be formed integrally as a single member.

Referring now to FIGS. 2-4 and 9, in various embodiments, the resistance member 450 may include a body 451 having any of various shapes. In some embodiments, the body 451 may have a disk shape. In some embodiments, the body 451 may have a substantially flat circular disk shape (not shown). In some embodiments, the body 451 may include an inner radial portion 454 connected to an outer radial portion 458 by a substantially frusto-conical intermediate portion 456. Advantageously, this may impart stiffness to the body 451 of the resistance member. Additionally, this may result in the viscous drive assembly 400 being more compact, and the clutch device 300 having a smaller size.

In various embodiments, the body 451 of the resistance member 450 may include one or more holes 453. The one or more holes 453 may allow fluid to flow between the two sides of the resistance member 450 to equalize the fluid level and/or the fluid pressure on each side. In some embodiments, the body 451 of the resistance member 450 may include slots, curves, surface treatments, or other geometrical features that may aid in fluid dispersion or fluid movement.

In some embodiments, the body 451 of the resistance member 450 may have an average axial thickness of between 0.05 and 0.12 inches. In other embodiments, the body 451 may have an average axial thickness of 0.05 inches or less. In still other embodiments, the body 451 may have an average axial thickness of between 0.08 and 0.25 inches. In still other embodiments, the body 451 may have an axial thickness of 0.25 inches or more. In still other embodiments, the body 451 may have an average axial thickness of between 0.1 inches and 0.15 inches.

In some embodiments, the resistance member 450 may have an outer diameter of between 3 and 5 inches. In still other embodiments, the resistance member 450 may have an outer diameter of 3 inches or less. In still other embodiments, the resistance member 450 may have an outer diameter of 5 inches or more. In still other embodiments, the resistance member 450 may have an outer diameter of between 4 and 5 inches.

Referring again to FIGS. 2-4, in some embodiments, the viscous fluid may surround a portion of the resistance member 450 in the viscous chamber 410. In some embodiments, the viscous fluid may be an oil, such as hydraulic oil. In other embodiments, the viscous fluid may be a heat-sensitive material, such as a silicone gel, that may thicken or expand under heated conditions.

Still referring to FIGS. 2-4, in some embodiments, the viscous chamber 410 may be disposed in an interior portion of the output member 350. In some embodiments, the viscous chamber 410 may be substantially defined by a space between surfaces of the front plate 351, the intermediate member 360, the piston 340, and the viscous sealing assembly 420. The viscous chamber 410 may include a radially inward portion 412 and a radially outward portion 416.

In some embodiments, the viscous chamber 410 may be defined in part by a cup portion 347 disposed in the piston 340. In some embodiments, this cup portion 347 may have a generally concave shape. In some embodiments, the cup portion 347 may have a generally frusto-conical shape. This generally frusto-conical shape of the cup portion 347 may be wider toward the forward end portion 349 of the piston 340. Advantageously, the generally frusto-conical shape of the cup portion 347 may promote flowing of the viscous fluid out of the cup portion 347 due to a centrifugal motion of the cup portion 347. Accordingly, when the input member 310 is driven to rotate at the first speed, the viscous fluid may tend to flow out of the cup portion 347 and from the radially inward portion 412 toward the radially outward portion 416 of the viscous chamber 410.

In some embodiments, the viscous chamber 410 may be defined in part by a bowl portion 386 of the front plate 351. In some embodiments, this bowl portion 386 may have a generally concave shape. In some embodiments, the bowl portion 386 may have a generally frusto-conical shape. This generally frusto-conical shape of the bowl portion 386 may promote flowing of the viscous fluid out of the bowl portion 386 due to the centrifugal motion of the bowl portion 386. Accordingly, when the output member 350 is driven to rotate, the viscous fluid may tend to flow out of the bowl portion 386 and from the radially inward portion 412 toward the radially outward portion 416 of the viscous chamber 410.

In some embodiments, the cup portion 347 may enclose a volume amounting to half or more of the total volume of the viscous chamber 410. In this way, it may be reasonably assured that a sufficient supply of the viscous fluid is provided in the viscous chamber 410 when the clutch device 300 is assembled, or for example, when the front plate 351 is replaced, following repair or maintenance work. If the front plate 351 is removed, the viscous fluid may tend to spill or leak out of the viscous chamber 410. However, prior to securing the front plate 351 to the intermediate member 360, the intermediate member 360 may be oriented so that the cup portion 347 opens vertically upward (opposing gravity). With the intermediate member 360 oriented in this way, the cup portion 347 may be filled in whole or in part with the viscous fluid, after which the front plate 351 may be secured to the intermediate member 360, thereby closing-off the viscous chamber 410. In an embodiment where at least half of the total volume of the viscous chamber 410 is occupied by the volume of the viscous fluid supplied in the cup portion 347, when the clutch device 300 rotates, the viscous fluid may flow out of the cup portion 347, completely filling the remaining volume of the viscous chamber 410, including those portions of the viscous chamber in which the resistance member 450 may be disposed.

In some embodiments, the cup portion 347 and the bowl portion 386 may prevent or reduce pressure from building-up in the viscous chamber 410, due to thermal expansion of a fluid such as the viscous fluid and/or air in the viscous chamber 410. The cup portion 347 and the bowl portion 386 may facilitate heat dissipation.

In some embodiments, the output member 350 may include an opening 366 through which the viscous fluid may be inserted into or removed from the viscous chamber 410. In various embodiments, the opening 366 may be disposed in the front plate 351. A sealing device (not shown), such as a plug, a cap, or a screw may seal the opening to prevent the viscous fluid from escaping from the viscous chamber 410.

In accordance with an embodiment, the viscous fluid may provide a torque transfer between the resistance member 450 and the output member 350. A rotation of the resistance member 450 may impart a shearing force on the viscous fluid. The viscous fluid in a rear portion 413 of the viscous chamber 410 between the intermediate member 360 and the resistance member 450 may transfer the shearing force between the resistance member 450 and the intermediate member 360. Likewise, the viscous fluid in a front portion 415 of the viscous chamber 410 between the resistance member 450 and the front plate 351 may transfer the shearing force between the resistance member 450 and the front plate 351. Thus, the viscous drive assembly 400 according to an embodiment may provide a torque transfer from the input member 310 to the output member 350, thereby causing the output member 350 to rotate at the second speed when the input member 310 is driven to rotate at the first speed. Advantageously, according to some embodiments, with the resistance member 450 disposed in the viscous chamber 410, the effective surface area of the viscous drive assembly 400 in contact with the viscous fluid, and thus, the available torque transfer at the second speed, may be substantially greater than in other clutch devices.

In various embodiments, the second speed may be changed by altering one or more of the following: the viscosity of the viscous fluid, the amount of viscous fluid provided in the viscous chamber 410, the geometry of the front plate 351, the geometry of the intermediate member 360, the geometry of the piston 340, the geometry of the resistance member 450, the geometry of the nut 460, the size of the space between the intermediate member 360 and the resistance member 450, and the size of the space between the resistance member 450 and the front plate 351. In some embodiments, one or more surfaces of the resistance member 450, the intermediate member 360, or the front plate 351 may have a greater effective surface area due to the presence of various patterns or shapes, thereby increasing the contact area with the viscous fluid.

Advantageously, the viscous drive assembly 400 may be substantially contained within the output member 350. Accordingly, in some embodiments of the fan clutch system 10, the viscous drive assembly 400 may remain entirely intact even when the clutch device 300 is removed from the drive member 100. This may reduce the cost and/or complexity of performing repairs.

Moreover, in some embodiments, the viscous chamber 410 may have a constant volume. Accordingly, the clutch device 300 may undergo reduced wear and may thus have an increased service life compared to other clutch devices.

Thus, according to various embodiments, the clutch device 300 may provide torque transfer to rotate the output member 350 at the first speed when the friction drive assembly 370 is in the engaged position and to rotate the output member 350 at the second speed when the friction drive assembly 370 is in the disengaged position.

Figure 5:
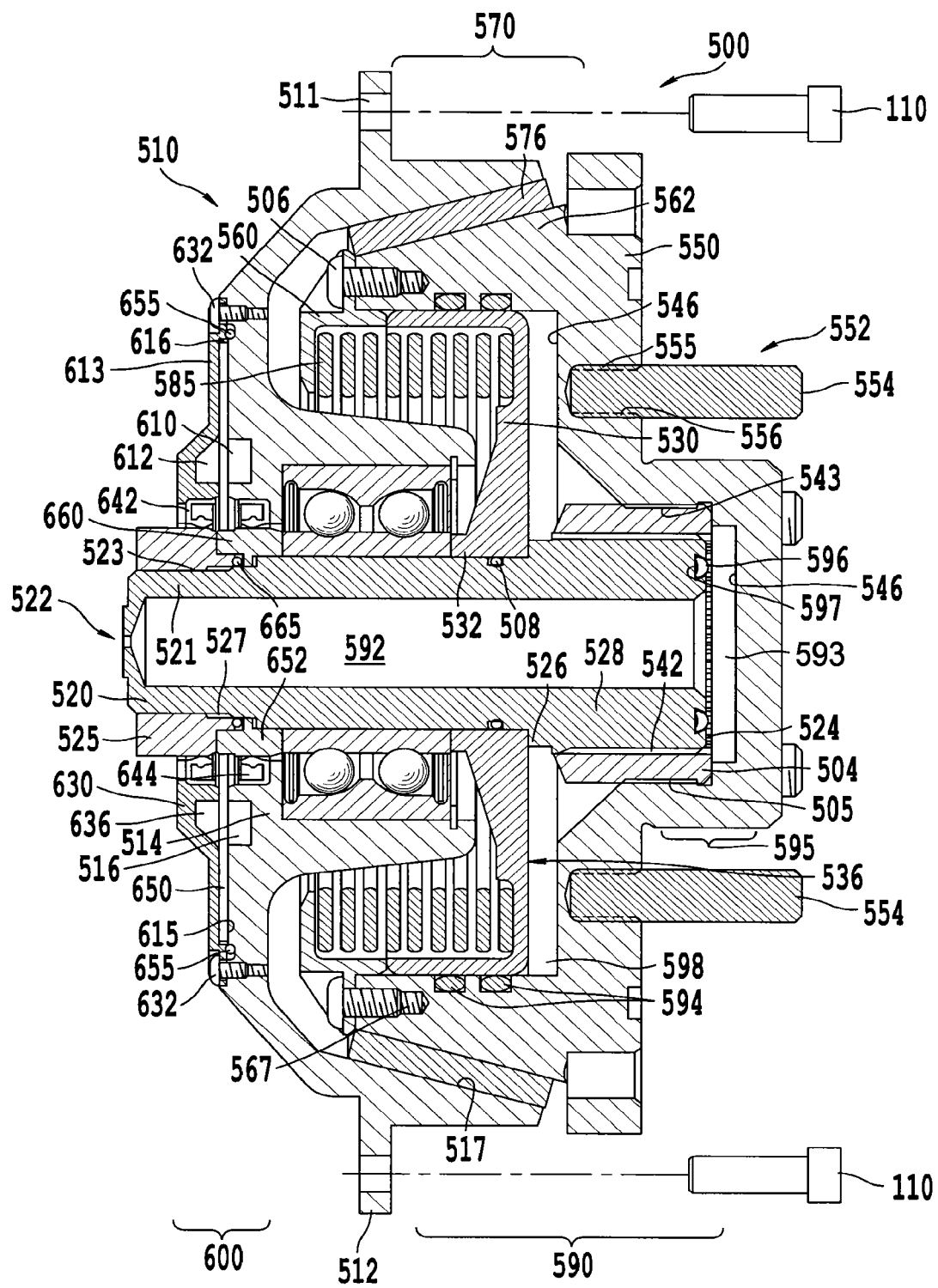
FIG. 5 is a cutaway side view of a clutch device in accordance with another embodiment.
Figure 6:
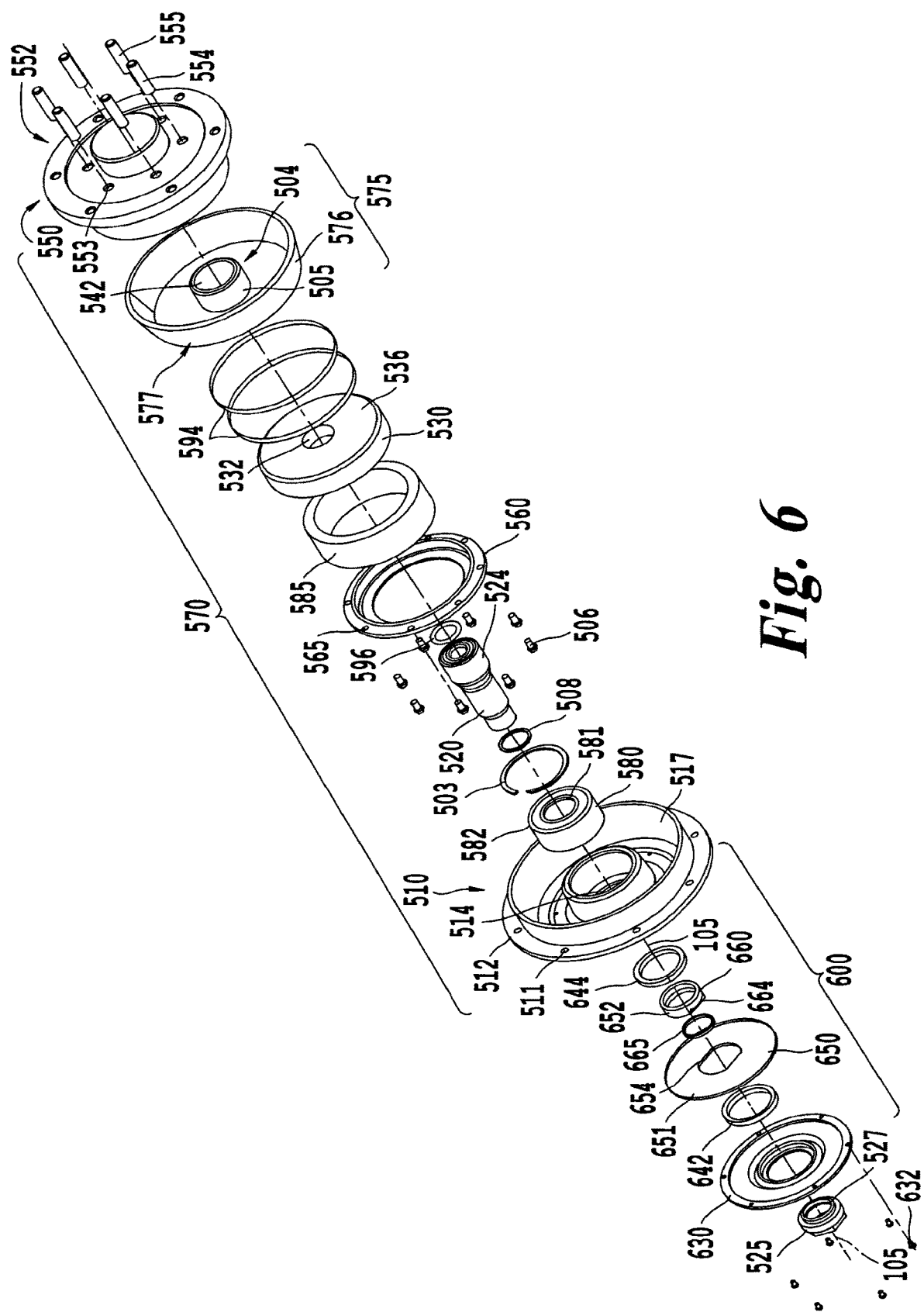
FIG. 6 is an exploded perspective view of a clutch device of in accordance with the another embodiment.

A fan clutch system 20 (not shown) according to an embodiment may include the drive device 100 (shown in FIGS. 1 and 2), the fan blade device 200 (shown in FIG. 1), and a clutch device 500 (shown in FIGS. 5 and 6).

Referring now to FIGS. 5 and 6, some embodiments of a clutch device 500 may include an input member 510, a central shaft 520, an output member 550, a friction drive assembly 570, a biasing member 585, a fluid actuator assembly 590, and a viscous drive assembly 600. The input member 510 of the clutch device 500 may include a drive device mounting portion 512 for coupling the output member 102 of the drive device 100 to the input member 510. Coupled in this way, when the output member 102 rotates at a first speed, the input member 510 may rotate with the driving member 102 at the first speed about the axis of rotation 105. In an embodiment, the drive device mounting portion 512 may have a flange shape. Two or more bolts 110 may be used to axially mate the drive device mounting portion 512 via two or more through holes 511 to the two or more receiving holes 112 in the driving member 102 of the drive device 100. Advantageously, this may greatly reduce the cost and/or effort required when servicing the clutch device 500 or the fan clutch system 20, as compared to other clutches and systems. Specifically, the clutch device 500 may remain essentially intact as a single unit when removed from the drive device 100 of the fan clutch system 20, as in the case of repair or replacement.

Still referring to FIGS. 5 and 6, the output member 550 may be coupled to the input member 510, for example on a bearing assembly 580 in a manner such that the output member 550 may rotate about the axis 105 relative to the input member 510. The output member 550 may include an output device mounting portion 552. In some embodiments, the output device mounting portion 552 may include two or more mounting studs 554 that protrude from the output member 550. In some embodiments, the output device mounting portion 552 may include threaded holes, snap-fits, or other attachment means for mounting an output device, such as the fan blade device 200, on the output device mounting portion 552.

Still referring to FIGS. 5 and 6, the clutch device 500 may be removably mountable to the drive member 100. In an embodiment, each of the two or more bolts 110 may be passed through one of the two or more through holes 511 and secured in one of the two or more receiving holes 112. Thus, via the drive device mounting portion 512, the input member 510 may be fixed to a forward end 104 of the driving member 102 of the drive device 100.

In some embodiments, the input member 510 may have an outer diameter of between 4 and 8 inches. In other embodiments, the input member 510 may have an outer diameter of 4 inches or less. In still other embodiments, the input member 510 may have an outer diameter of 8 inches or more. In still other embodiments, the input member 510 may have an outer diameter of between 7 and 9 inches.

While the driving portion 102 may be driven to rotate about the axis 105 at a first speed, the shaft portion 124, and thus the fluid supply outlet 160, may remain substantially stationary. Accordingly, some embodiments of the fluid supply outlet 160 may include the outlet biasing member 162 that urges the outlet nozzle 164 toward the forward end 104 of the driving member 102, thereby ensuring a tight connection between the fluid supply outlet 160 and a fluid inlet portion 522 in the central shaft 520 of the clutch device 500. Some embodiments of the fan clutch system 20 may include the face seal 106 that may be disposed axially between the outlet nozzle 164 and the fluid inlet portion 522. In some embodiments, the outlet nozzle 164 may rotate at approximately the first speed when the input member 510 is driven to rotate at the first speed. In other embodiments, the outlet nozzle 164 may remain substantially stationary or may rotate at a speed slower than the first speed when the input member 510 is driven to rotate at the first speed.

Still referring to FIGS. 5 and 6, the output member 550 may be mounted on the central shaft 520 so that the output member 550 is able to translate axially relative to the input member 510. In some embodiments, the central shaft 520 may include an outer splined portion 524 that intermeshes with a corresponding inner splined portion 542 of the output member 550. In some embodiments, the inner splined portion 542 may be formed integrally in the output member 550. In other embodiments, the inner splined portion 542 may be disposed on a spline insert 504. The spline insert 504 may have a threaded portion 505 that engages with a threaded portion 543 of the output member 550. The outer splined portion 524 of the central shaft 520 and the inner splined portion 542 of the output member 550 each may extend in the axial direction so as to guide the translation of the output member 550 in the axial direction relative to the input member 510.

The device mounting portion 552 may include the two or more studs 554 that protrude from the output member 550. In some embodiments, each of the two or more studs 554 may have an external threaded portion 555 that engages with an internal threaded portion 556 of a hole 553 in the output member 550. In other embodiments, the two or more studs 554 may be formed integrally with the output member 550.

Still referring to FIGS. 5 and 6, the friction drive assembly 570 may include a friction medium 575 disposed between the input member 510 and the output member 550. In some embodiments, as shown in FIGS. 5 and 6, the friction medium 575 may include a friction ring 576. The friction ring 576 may be fixedly attached to the output member 550, for example, by bolts (not shown), and/or by other attachment means such as an adhesive. In some embodiments, the friction ring 576 may be attached to an outer periphery portion 562 of the output member 550.

In various embodiments, the friction medium 575 may be made of a metal, ceramic, or other material or combination of materials that is capable of providing frictional engagement and is capable of dissipating heat. An engagement surface 577 of the friction ring 576 may have a generally frusto-conical shape. An opposing friction surface 517 of the input member 510 may likewise have a generally frusto-conical shape. Accordingly, the engagement surface 577 and the opposing friction surface 517 may form a frusto-conical friction interface. In an embodiment, a radius of the frusto-conical friction interface may increase as the frusto-conical friction interface extends toward the output device mounting portion 552 of the output member 550. In another embodiment, the radius of the frusto-conical friction interface may decrease as the frusto-conical friction interface extends toward the output device mounting portion 552. The shape and orientation of the friction medium 575 may provide the friction drive assembly 570 with a conical wedging action. This conical wedging action may improve the engagement friction, thereby providing enhanced torque transfer capabilities. In some embodiments, the friction medium 575 and the opposing friction surface 517 may be defined by a substantially flat friction interface.

In some embodiments, the friction ring 576 may have an average diameter of between 3 and 6 inches. In other embodiments, the friction ring 576 may have an average diameter of 3 inches or less. In still other embodiments, the friction ring 576 may have an average diameter of 6 inches or more. In still other embodiments, the friction ring 576 may have an average diameter of between 5 and 7 inches.

Still referring to FIGS. 5 and 6, the bearing assembly 580 may rotatingly couple the input member 510 to the central shaft 520. The bearing assembly 580 may allow the central shaft 520 to rotate about the axis 105 relative to the input member 510. In some embodiments, the bearing assembly 580 may include a single bearing device, such as a ball bearing device, a roller bearing device, or a bushing, for example. In other embodiments, the bearing assembly 580 may include two or more bearing devices or combinations of bearing devices. Advantageously, the clutch device 500 according to some embodiments may require fewer rotational-type bearing devices as compared to other clutch devices. A retainer ring 503 may retain an outer race 582 of the bearing assembly 580 axially against a shoulder portion 514 of the input member 510, while at the same time leaving an inner race 581 of the bearing assembly 580 substantially free to rotate about the axis 105 with respect to the input member 510.

Still referring to FIGS. 5 and 6, the biasing member 585 may be disposed between the central shaft 520 and the output member 550. The biasing member 585 may provide a force on the output member 550 to urge the output member 550 to translate in the axial direction, thereby biasing the friction drive assembly 570 toward an engaged position. In the engaged position, the engagement surface 577 of the friction ring 576 may frictionally engage with the opposing friction surface 517 of the input member 510. When the friction drive assembly 570 is in the engaged position, the input member 510 may transfer torque via the friction medium 575 to the output member 550, thereby driving the output member 550 to rotate with the input member 510 at the first speed. In various embodiments, the biasing member 585 may include a metallic coil spring, an elastomer, a fluidic damper, or a combination of these, for example. In some embodiments, the biasing member may urge the friction drive assembly 570 toward a disengaged position in which the engagement surface 577 is spaced apart from the opposing friction surface 517.

Still referring to FIGS. 5 and 6, the output member 550 may include a spring engaging member 560. The central shaft 520 may include a spring retaining member 530. In some embodiments, the spring engaging member 560 may be removably attached to the output member 550, for example, by one or more screws 506 that may extend through one or more holes 565 in the spring engaging member and into one or more holes 567 in the output member 550. In other embodiments, the spring engaging member 560 may be formed integrally with one or more other portions of the output member 550.

In some embodiments, a hub portion 532 of the spring retaining member 530 may be axially clamped between the inner race 581 of the bearing assembly 580 and a shoulder portion 526 of the central shaft 520. One or more seals 508 may be disposed between the hub portion 532 of the spring retaining member 530 and the central shaft 520.

The biasing member 585 may be disposed between the spring engaging member 560 and the spring retaining member 530 so that when the spring engaging member 560 moves axially toward the spring retaining member 530, the biasing member 585 is thereby compressed in length. Conversely, when the biasing member expands 585 in length, the spring engaging member 560 may move axially away from the spring retaining member 530.

Still referring to FIGS. 5 and 6, the fluid actuator assembly 590 may selectively oppose the biasing member 585 to urge the friction drive assembly 570 toward one of the engaged position or the disengaged position. Thus, in an embodiment wherein the biasing member 585 biases the friction drive assembly 570 toward the engaged position, the fluid actuator assembly 590 may be activated to overcome the force of the biasing member 585, thereby moving the friction drive assembly 570 toward the disengaged position. Alternatively, in an embodiment wherein the biasing member 585 biases the friction drive assembly 570 toward the disengaged position, the fluid actuator assembly 590 may be activated to overcome the force of the biasing member 585, thereby moving the friction drive assembly 570 to the engaged position.

Still referring to FIGS. 5 and 6, the fluid actuator assembly 590 may include a fluid receiving chamber 592. In some embodiments, the fluid actuator assembly 590 may be activated by providing the pressurized fluid (as discussed above with respect to the drive device 100) to the fluid inlet portion 522, which may be in fluid communication with the fluid receiving chamber 592. In some embodiments, the central shaft 520, the spring retaining member 530, and the output member 550 may be arranged such that a space between them substantially defines the fluid receiving chamber 592. In some embodiments, the fluid receiving chamber 592 may be defined in part by a front face 536 of the spring retaining member 530 and a rear face 546 of the output member 550. One or more seal devices 594 may be disposed between an outer periphery of the spring retaining member 530 and an inner periphery of the output member 550 to reduce or prevent the pressurized fluid from leaking out of the fluid receiving chamber 592.

In some embodiments, when the fluid receiving chamber 592 receives the pressurized fluid, the pressurized fluid may exert a force on the output member 550, thereby displacing the spring engaging member 560, and thus the output member 550, in the axially forward direction against the biasing member 585 and shifting the friction drive assembly 570 into the disengaged position, wherein a gap exists between the engagement surface 577 of the friction ring 576 and the opposing friction surface 517 of the input member 510. When the pressurized fluid is evacuated from the fluid receiving chamber 592, the fluid pressure force on the output member 550 is reduced, and the biasing member 585 urges the output member 550 axially rearward, thereby returning the friction drive assembly 570 to the engaged position.

In some embodiments of a clutch system 20 incorporating a clutch device 500 in accordance with an embodiment, transitions between the engaged position and the disengaged position may be controlled manually. For example, in an embodiment, an operator of a motor vehicle may flip a switch, or press a button, in response to which a valve in a compressed air system (not shown) may release compressed air into the fluid inlet portion 522 via the fluid supply input 150. In other embodiments, transitions between the engaged position and the disengaged position may be controlled automatically. For example, in an embodiment, a thermostatic device may provide the pressurized fluid to the fluid inlet portion 522 when a threshold temperature is met or exceeded.

Still referring to FIGS. 5 and 6, the fluid receiving chamber 592 may include an inner portion 593 and an outer portion 598, separated in the radial direction by an auto-stop sealing assembly 595. The auto-stop sealing assembly 595 may include a seal body 596 seated in a groove pocket 597 in a forward end 528 of the central shaft 520 axially opposite the rear face 546 of the output member 550. In an embodiment, when the axial thickness of the friction medium 575 is worn down to, or below, a predetermined threshold thickness, the seal body 596 may engage with the rear face 546 of the output member 550. Thus, the rear face 546 may be a sealing surface against which the seal body 596 forms a fluid seal. In this configuration, the pressurized fluid may not flow from the inner portion 593 of the fluid receiving chamber 592, past the seal body 596 of the auto-stop sealing assembly 595, and into the outer portion 598 of the fluid receiving chamber 592. Thus, the auto-stop sealing assembly 595 may stop the friction drive assembly 570 from moving to the disengaged position. In another embodiment, the auto-stop sealing assembly 595 may stop the friction drive assembly 570 from moving to the engaged position.

In some embodiments, the seal body 596 may have a substantially toroidal shape defined by a cross-section revolved about an axis of revolution. The cross-section of the seal body 596 may include a dovetail shape. In some embodiments, the groove pocket 597 may likewise have a substantially toroidal shape defined by a cross-section revolved about an axis of revolution. The cross-section of the groove pocket 597 may include a dovetail shape to frictionally retain the seal body 596 in the groove pocket 597.

Still referring to FIGS. 5 and 6, the viscous drive assembly 600 may fluidically couple the input member 510 to the output member 550 so that the output member 550 rotates at a second speed slower than the first speed when the friction drive assembly 570 is in the disengaged position. The viscous drive assembly 600 may include a viscous fluid disposed in a viscous chamber 610 and a resistance member 650 disposed in the viscous chamber 610.

In some embodiments, the resistance member 650 may be coupled to rotate with the central shaft 520. In some embodiments, the resistance member 650 may be axially clamped between the inner race 581 of the bearing assembly 580 and a nut 525. The nut 525 may retain a hub portion 652 of the resistance member 650 axially against the inner race 581, the inner race 581 axially against the hub portion 532 of the spring retaining member 530, and the hub portion 532 axially against the shoulder portion 526 of the central shaft 520. A threaded portion 527 of the nut 525 may engage with a threaded portion 523 of a rear end portion 521 of the central shaft 520 to axially clamp the hub portion 652, the inner race 581, and the hub portion 532 axially against the shoulder portion 526. In some embodiments, the hub portion 652 may be comprised in a hub member 660. In some embodiments, the hub member 660 may have a profiled portion 664 that interlocks with a corresponding profiled portion 654 of a body 651 of the resistance member 650. In some embodiments, a seal 665 may be disposed between the nut 525 and the hub portion 652.

In various embodiments, the resistance member 650 may include the body 651 having any of various shapes. In some embodiments, the body 651 may have a disk shape. In some embodiments, the body 651 may have a substantially flat circular disk shape.

Figure 9:
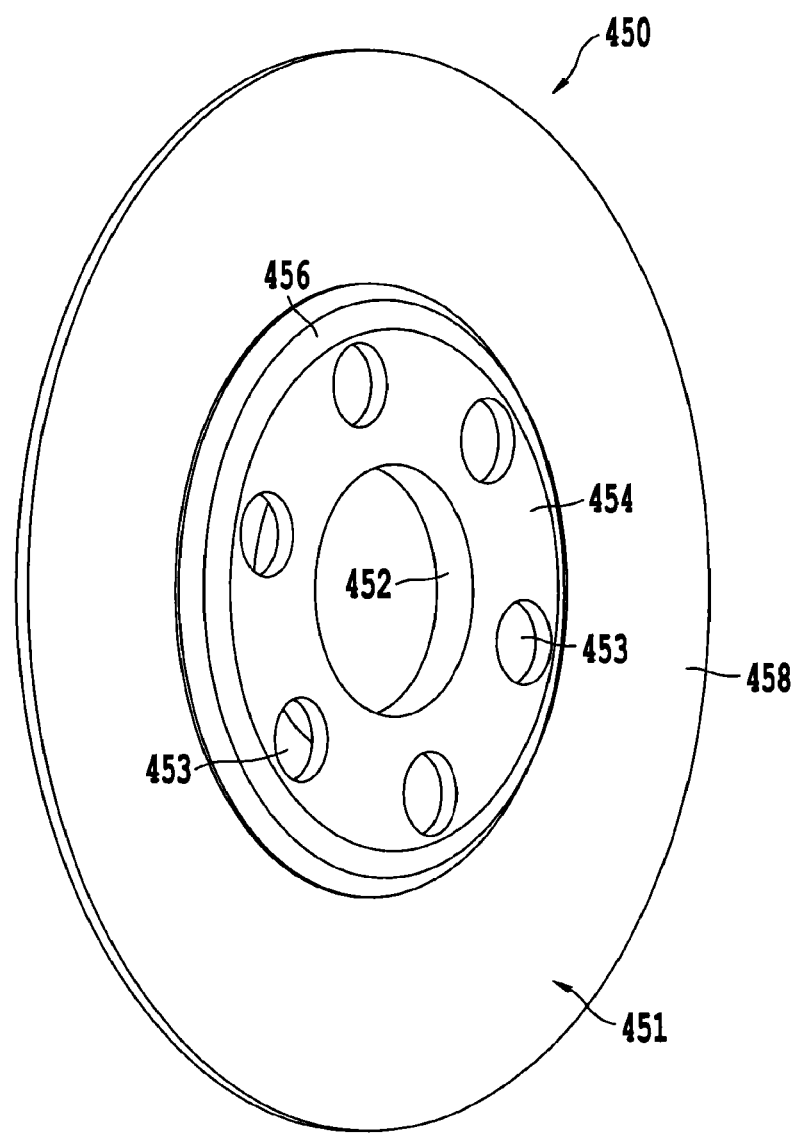
FIG. 9 is a perspective view of a resistance member in accordance with an embodiment.

In various embodiments, the body 651 of the resistance member 650 may include one or more holes (similar to those shown with respect to resistance member 450 in FIG. 9). The one or more holes may allow fluid to flow between the two sides of the resistance member 650 to equalize the fluid level and/or the fluid pressure on each side. In some embodiments, the body 651 of the resistance member 650 may include slots, curves, surface treatments, or other geometrical features that may aid in fluid dispersion or fluid movement.

In some embodiments, the body 651 of the resistance member 650 may have an average axial thickness of between 0.01 and 0.05 inches. In other embodiments, the body 651 may have an average axial thickness of 0.01 inches or less. In still other embodiments, the body 651 may have an average axial thickness of between 0.04 and 0.15 inches. In still other embodiments, the body 651 may have an axial thickness 0.15 inches or more. In still other embodiments, the body 651 may have an average axial thickness of between 0.04 inches and 0.06 inches.

In some embodiments, the resistance member 650 may have an outer diameter of between 3 and 5 inches. In still other embodiments, the resistance member 650 may have an outer diameter of 3 inches or less. In still other embodiments, the resistance member 650 may have an outer diameter of 5 inches or more. In still other embodiments, the resistance member 650 may have an outer diameter of between 4 and 5 inches.

Still referring to FIGS. 5 and 6, in some embodiments, the viscous fluid may surround a portion of the resistance member 650 in the viscous chamber 610. In some embodiments, the viscous fluid may be an oil, such as hydraulic oil. In other embodiments, the viscous fluid may be a heat-sensitive material, such as a silicone gel, that may thicken or expand under heated conditions. Still referring to FIGS. 5 and 6, a rear wiper seal 642 and a front wiper seal 644 may be disposed on opposite sides of the viscous chamber 610.

Still referring to FIGS. 5 and 6, in some embodiments, the viscous chamber 610 may be disposed in an interior portion of the input member 510. In some embodiments, the viscous chamber 610 may be substantially defined by a space between surfaces of the input member 510 and a rear cover 630. The viscous chamber 610 may include a radially inward portion 612 and a radially outward portion 616. One or more screws 632 may attach the rear cover 630 to the input member 510. Some embodiments may include a seal body between the cover 630 and the input member 510. In some embodiments, the viscous chamber 610 may include a cavity portion 516 of the input member 510. In some embodiments, the viscous chamber 610 may include a cavity portion 636 of the rear cover 630.

In accordance with an embodiment, the viscous fluid may provide a torque transfer between the input member 510 and the resistance member 650. A rotation of the input member 510 may impart a shearing force on the viscous fluid. The viscous fluid in a rear portion 613 of the viscous chamber 610 between the rear cover 630 and the resistance member 650 may transfer the shearing force between the rear cover 630 and the resistance member 650. Likewise, the viscous fluid in a front portion 615 of the viscous chamber 610 between the resistance member 650 and the input member 510 may transfer the shearing force between the input member 510 and the resistance member 650. This may result in a torque on the central shaft 520 to which the resistance member 650 may be rotationally coupled, and from the central shaft 520 to the output member 550 to which the central shaft may be rotationally coupled. Thus, the viscous drive assembly 600 according to an embodiment may provide a torque transfer from the input member 510 to the output member 550, thereby causing the output member 550 to rotate at the second speed when the input member 510 is driven to rotate at the first speed. Advantageously, according to some embodiments, with the resistance member 650 disposed in the viscous chamber 610, the effective surface area of the viscous drive assembly 600 in contact with the viscous fluid, and thus, the available torque transfer at the second speed, may be substantially greater than in other clutch devices.

In various embodiments, the second speed may be changed by altering one or more of the following: the viscosity of the viscous fluid, the amount of viscous fluid provided in the viscous chamber 610, the geometry of the rear cover 630, the geometry of the input member 510, the size of the space between the rear cover 630 and the resistance member 650, and the size of the space between the resistance member 650 and the input member 510. In some embodiments, one or more surfaces of the resistance member 650, the rear cover 630, or the input member 510 may have a greater effective surface area due to the presence of various patterns or shapes, thereby increasing the contact area with the viscous fluid.

Advantageously, the viscous drive assembly 600 may be substantially contained within the input member 510. Accordingly, in some embodiments of the fan clutch system 20, the viscous drive assembly 600 may remain entirely intact even when the clutch device 500 is removed from the drive member 100. This may reduce the cost and/or complexity of performing repairs.

Moreover, in some embodiments, the viscous chamber 610 may have a constant volume. Accordingly, the clutch device 500 may undergo reduced wear and may thus have an increased service life compared to other clutch devices.

Thus, according to various embodiments, the clutch device 500 may provide torque transfer to rotate the output member 550 at the first speed when the friction drive assembly 570 is in the engaged position and to rotate the output member 550 at the second speed when the friction drive assembly 570 is in the disengaged position.

Figure 7:
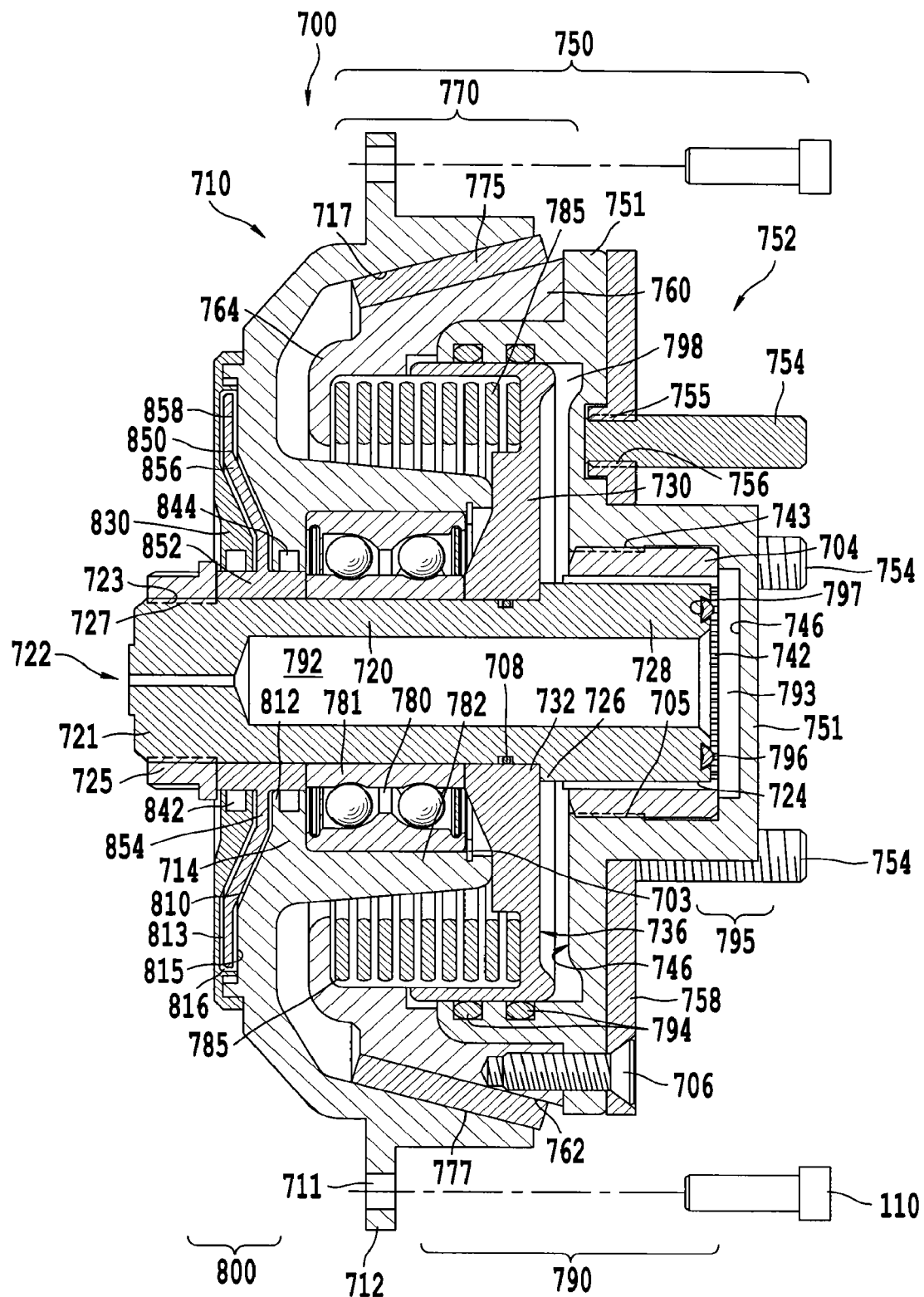
FIG. 7 is a cutaway side view of a clutch device in accordance with yet another embodiment.
Figure 8:
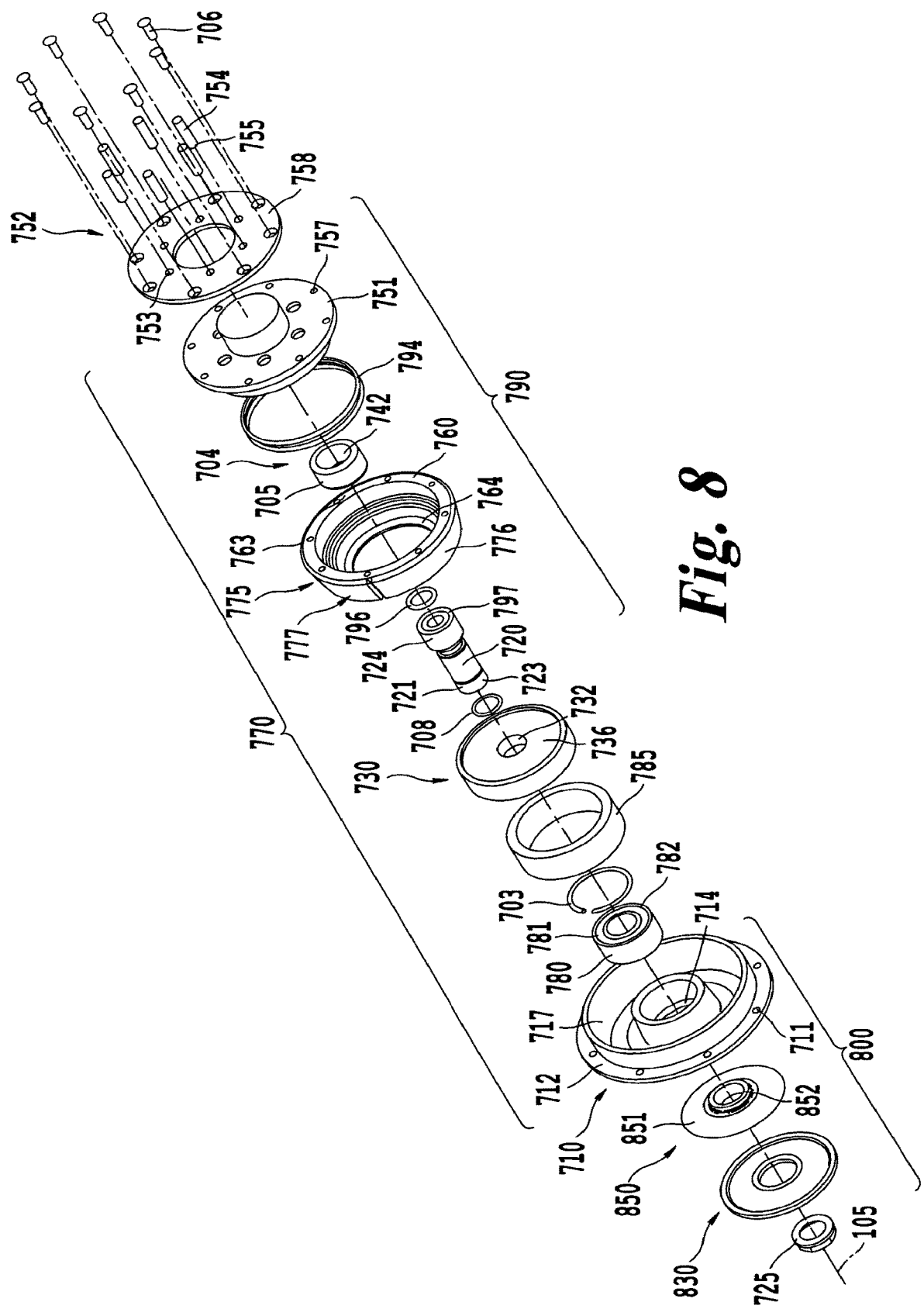
FIG. 8 is an exploded perspective view of a clutch device in accordance with the yet another embodiment.

A fan clutch system 30 (not shown) according to an embodiment may include the drive device 100 (shown in FIGS. 1 and 2), the fan blade device 200 (shown in FIG. 1), and a clutch device 700 (shown in FIGS. 7 and 8).

Referring now to FIGS. 7 and 8, some embodiments of a clutch device 700 may include an input member 710, a central shaft 720, an output member 750, a friction drive assembly 770, a biasing member 785, a fluid actuator assembly 790, and a viscous drive assembly 800. The input member 710 of the clutch device 700 may include a drive device mounting portion 712 for coupling the output member 102 of the drive device 100 to the input member 710. Coupled in this way, when the output member 102 rotates at a first speed, the input member 710 may rotate with the driving member 102 at the first speed about the axis of rotation 105. In an embodiment, the drive device mounting portion 712 may have a flange shape. Two or more bolts 110 may be used to axially mate the drive device mounting portion 712 via two or more through holes 711 to the two or more receiving holes 112 in the driving member 102 of the drive device 100. Advantageously, this may greatly reduce the cost and/or effort required when servicing the clutch device 700 or the fan clutch system 30, as compared to other clutches and systems. Specifically, the clutch device 700 may remain essentially intact as a single unit when removed from the drive device 100 of the fan clutch system 30, as in the case of repair or replacement.

Still referring to FIGS. 7 and 8, the output member 750 may be coupled to the input member 710, for example on a bearing assembly 780 in a manner such that the output member 750 may rotate about the axis 105 relative to the input member 710. The output member 750 may include a front plate 751, an output device mounting portion 752, and an intermediate member 760. In some embodiments, the output device mounting portion 752 may include two or more mounting studs 754 that protrude from the output member 750. In some embodiments, the output device mounting portion 752 may include threaded holes, snap-fits, or other attachment means for mounting an output device, such as the fan blade device 200, on the output device mounting portion 752.

Still referring to FIGS. 7 and 8, the clutch device 700 may be removably mountable to the drive member 100. In an embodiment, each of the two or more bolts 110 may be passed through one of the two or more through holes 711 and secured in one of the two or more receiving holes 112. Thus, via the drive device mounting portion 712, the input member 710 may be fixed to a forward end 104 of the driving member 102 of the drive device 100.

In some embodiments, the input member 710 may have an outer diameter of between 4 and 8 inches. In other embodiments, the input member 710 may have an outer diameter of 2 inches or less. In still other embodiments, the input member 710 may have an outer diameter of 8 inches or more. In still other embodiments, the input member 710 may have an outer diameter of between 7 and 9 inches.

While the driving portion 102 may be driven to rotate about the axis 105 at a first speed, the shaft portion 124, and thus the fluid supply outlet 160, may remain substantially stationary. Accordingly, some embodiments of the fluid supply outlet 160 may include the outlet biasing member 162 that urges the outlet nozzle 164 toward the forward end 104 of the driving member 102, thereby ensuring a tight connection between the fluid supply outlet 160 and a fluid inlet portion 722 in the central shaft 720 of the clutch device 700. Some embodiments of the fan clutch system 30 may include the face seal 106 that may be disposed axially between the outlet nozzle 164 and the fluid inlet portion 722. In some embodiments, the outlet nozzle 164 may rotate at approximately the first speed when the input member 710 is driven to rotate at the first speed. In other embodiments, the outlet nozzle 164 may remain substantially stationary or may rotate at a speed slower than the first speed when the input member 710 is driven to rotate at the first speed.

Still referring to FIGS. 7 and 8, the output member 750 may be mounted on the central shaft 720 so that the output member 750 is able to translate axially relative to input member 710. In some embodiments, the central shaft 720 may include an outer splined portion 724 that intermeshes with a corresponding inner splined portion 742 of the front plate 751. In some embodiments, the inner splined portion 742 may be formed integrally in the front plate 751. In other embodiments, the inner splined portion 742 may be disposed on a spline insert 704. The spline insert 704 may have a threaded portion 705 that engages with a threaded portion 743 of the front plate 751. The outer splined portion 724 of the central shaft 720 and the inner splined portion 742 of the front plate 751 each may extend in the axial direction so as to guide the translation of the output member 750 in the axial direction relative to the input member 710.

Still referring to FIGS. 7 and 8, the device mounting portion 752 may include two or more studs 754 that protrude from the output member 750. The device mounting portion 752 may include a stud mounting plate 758. Each of the two or more studs 754 may have an external threaded portion 755 that engages with an internal threaded portion 756 of a hole 753 in the stud mounting plate 758. One or more screws 706 may attach the stud mounting plate 758 to the front plate 751. In some embodiments, other attachment means such as an adhesive or other axial clamping means may be used, for example. In other embodiments, the two or more studs 754 may be formed integrally with the stud mounting plate 758. In some embodiments, the one or more screws 706 may be employed both to attach the stud mounting plate 758 to the front plate 751 and to attach the intermediate member 760 to the front plate 751.

Still referring to FIGS. 7 and 8, the friction drive assembly 770 may include a friction medium 775 disposed between the input member 710 and the output member 750. In some embodiments, as shown in FIGS. 7 and 8, the friction medium 775 may include a friction ring 776. The friction ring 776 may be fixedly attached to the output member 750, for example, by bolts (not shown), and/or by other attachment means such as an adhesive. In some embodiments, the friction ring 776 may be attached to an outer periphery portion 762 of the intermediate member 760.

In various embodiments, the friction medium 775 may be made of a metal, ceramic, or other material or combination of materials that is capable of providing frictional engagement and is capable of dissipating heat generated. An engagement surface 777 of the friction ring 776 may have a generally frusto-conical shape. An opposing friction surface 717 of the input member 710 may likewise have a generally frusto-conical shape. Accordingly, the engagement surface 777 and the opposing friction surface 717 may form a frusto-conical friction interface. In an embodiment, a radius of the frusto-conical friction interface may increase as the frusto-conical friction interface extends toward the output device mounting portion 752 of the output member 750. In another embodiment, the radius of the frusto-conical friction interface may decrease as the frusto-conical friction interface extends toward the output device mounting portion 752. The shape and orientation of the friction medium 775 may provide the friction drive assembly 770 with a conical wedging action. This conical wedging action may improve the engagement friction, thereby providing enhanced torque transfer capabilities. In some embodiments, the friction medium 775 and the opposing friction surface 717 may be defined by a substantially flat friction interface.

In some embodiments, the friction ring 776 may have an average diameter of between 3 and 6 inches. In other embodiments, the friction ring 776 may have an average diameter of 3 inches or less. In still other embodiments, the friction ring 776 may have an average diameter of 6 inches or more. In still other embodiments, the friction ring 776 may have an average diameter of between 5 and 7 inches.

Still referring to FIGS. 7 and 8, the bearing assembly 780 may rotatingly couple the input member 710 to the central shaft 720. The bearing assembly 780 may allow the central shaft 720 to rotate about the axis 105 relative to the input member 710. In some embodiments, the bearing assembly 780 may include a single bearing device, such as a ball bearing device, a roller bearing device, or a bushing, for example. In other embodiments, the bearing assembly 780 may include two or more bearing devices or combinations of bearing devices. Advantageously, the clutch device 700 according to some embodiments may require fewer rotational-type bearing devices as compared to other clutch devices. A retainer ring 703 may retain an outer race 782 of the bearing assembly 780 axially against a shoulder portion 714 of the input member 710, while at the same time leaving an inner race 781 of the bearing assembly 780 substantially free to rotate about the axis 105 with respect to the input member 710.

Still referring to FIGS. 7 and 8, the biasing member 785 may be disposed between the central shaft 720 and the output member 750. The biasing member 785 may provide a force on the output member 750 to urge the output member 750 to translate in the axial direction, thereby biasing the friction drive assembly 770 toward an engaged position. In the engaged position, the engagement surface 777 of the friction ring 776 may frictionally engage with the opposing friction surface 717 of the input member 710. When the friction drive assembly 770 is in the engaged position, the input member 710 may transfer torque via the friction medium 775 to the output member 750, thereby driving the output member 750 to rotate with the input member 710 at the first speed. In various embodiments, the biasing member 785 may include a metallic coil spring, an elastomer, a fluidic damper, or a combination of these, for example. In some embodiments, the biasing member may urge the friction drive assembly 770 toward a disengaged position in which the engagement surface 777 is spaced apart from the opposing friction surface 717.

Still referring to FIGS. 7 and 8, the intermediate member 760 of the output member 750 may include a spring engaging portion 764. The central shaft 720 may include a spring retaining member 730. As already discussed, the intermediate member 760 may be removably attached to the front plate 751, for example, by the one or more screws 706 that may extend through one or more holes 757 in the front plate 751 and into one or more holes 763 in the intermediate member 760. Advantageously, this may simplify assembly and disassembly of the output member 750 and the friction drive interface 770. This makes the biasing member 785 more easily accessible. In other embodiments, the spring engaging portion 764 may be formed integrally with one or more other portions of the output member 750.

In some embodiments, a hub portion 732 of the spring retaining member 730 may be axially clamped between the inner race 781 of the bearing assembly 780 and a shoulder portion 726 of the central shaft 720. One or more seals 708 may be disposed between the hub portion 732 of the spring retaining member 730 and the central shaft 720.

The biasing member 785 may be disposed between the intermediate member 760 and the spring retaining member 730 so that when the intermediate member 760 moves axially toward the spring retaining member 730, the biasing member 785 is thereby compressed in length. Conversely, when the biasing member 785 expands in length, the intermediate member 760 may move axially away from the spring retaining member 730.

Still referring to FIGS. 7 and 8, the fluid actuator assembly 790 may selectively oppose the biasing member 785 to urge the friction drive assembly 770 toward one of the engaged position or the disengaged position. Thus, in an embodiment wherein the biasing member 785 biases the friction drive assembly 770 toward the engaged position, the fluid actuator assembly 790 may be activated to overcome the force of the biasing member 785, thereby moving the friction drive assembly 770 toward the disengaged position. Alternatively, in an embodiment wherein the biasing member 785 biases the friction drive assembly 770 toward the disengaged position, the fluid actuator assembly 790 may be activated to overcome the force of the biasing member 785, thereby moving the friction drive assembly 770 to the engaged position.

Still referring to FIGS. 7 and 8, the fluid actuator assembly 790 may include a fluid receiving chamber 792. In some embodiments, the fluid actuator assembly 790 may be activated by providing the pressurized fluid (as discussed above with respect to the drive device 100) to the fluid inlet portion 722, which may be in fluid communication with the fluid receiving chamber 792. In some embodiments, the central shaft 720, the spring retaining member 730, and the front plate 571 may be arranged such that a space between them substantially defines the fluid receiving chamber 792. In some embodiments, the fluid receiving chamber 792 may be defined in part by a front face 736 of the spring retaining member 730 and a rear face 746 of the front plate 751. One or more seal devices 794 may be disposed between an outer periphery of the spring retaining member 730 and an inner periphery of the front plate 751 to reduce or prevent the pressurized fluid from leaking out of the fluid receiving chamber 792.

In some embodiments, when the fluid receiving chamber 792 receives the pressurized fluid, the pressurized fluid may exert a force on the front plate 751, thereby displacing the output member 750 in the axially forward direction against the biasing member 785 and shifting the friction drive assembly 770 into the disengaged position, wherein a gap exists between the engagement surface 777 of the friction ring 776 and the opposing friction surface 717 of the input member 710. When the pressurized fluid is evacuated from the fluid receiving chamber 792, the fluid pressure force on the front plate 751 is reduced, and the biasing member 785 urges the output member 750 axially rearward, thereby returning the friction drive assembly 770 to the engaged position.

In some embodiments of a clutch system 30 incorporating a clutch device 700 in accordance with an embodiment, transitions between the engaged position and the disengaged position may be controlled manually. For example, in an embodiment, an operator of a motor vehicle may flip a switch, or press a button, in response to which a valve in a compressed air system (not shown) may release compressed air into the fluid inlet portion 722 via the fluid supply input 150. In other embodiments, transitions between the engaged position and the disengaged position may be controlled automatically. For example, in an embodiment, a thermostatic device may provide the pressurized fluid to the fluid inlet portion 722 when a threshold temperature is met or exceeded.

Still referring to FIGS. 7 and 8, the fluid receiving chamber 792 may include an inner portion 793 and an outer portion 794, separated in the radial direction by an auto-stop sealing assembly 795. The auto-stop sealing assembly 795 may include a seal body 796 seated in a groove pocket 797 in a forward end 728 of the central shaft 720 axially opposite the rear face 746 of the output member 750. In an embodiment, when the axial thickness of the friction medium 775 is worn down to, or below, a predetermined threshold thickness, the seal body 796 may engage with the rear face 746 of the piston 740. Thus, the rear face 746 may be a sealing surface against which the seal body 796 forms a fluid seal. In this configuration, the pressurized fluid may not flow from the inner portion 793 of the fluid receiving chamber 792, past the seal body 796 of the auto-stop sealing assembly 795, and into the outer portion 798 of the fluid receiving chamber 792. Thus, the auto-stop sealing assembly 795 may stop the friction drive assembly 770 from moving to the disengaged position. In another embodiment, the auto-stop sealing assembly 795 may stop the friction drive assembly 770 from moving to the engaged position.

In some embodiments, the seal body 796 may have a substantially toroidal shape defined by a cross-section revolved about an axis of revolution. The cross-section of the seal body 796 may include a dovetail shape. In some embodiments, the groove pocket 797 may likewise have a substantially toroidal shape defined by a cross-section revolved about an axis of revolution. The cross-section of the groove pocket 797 may include a dovetail shape to frictionally retain the seal body 796 in the groove pocket 797.

Still referring to FIGS. 7 and 8, the viscous drive assembly 800 may fluidically couple the input member 710 to the output member 750 so that the output member 750 rotates at a second speed slower than the first speed when the friction drive assembly 770 is in the disengaged position. The viscous drive assembly 800 may include a viscous fluid disposed in a viscous chamber 810 and a resistance member 850 disposed in the viscous chamber 810.

In some embodiments, the resistance member 850 may be coupled to rotate with the central shaft 720. In some embodiments, the resistance member 850 may be axially clamped between the inner race 781 of the bearing assembly 780 and a nut 725. The nut 725 may retain a hub portion 852 of the resistance member 850 axially against the inner race 781, the inner race 781 axially against the hub portion 732 of the spring retaining member 730, and the hub portion 732 axially against the shoulder portion 726 of the central shaft 720. A threaded portion 727 of the nut 725 may engage with a threaded portion 723 of a rear end portion 721 of the central shaft 720 to axially clamp the hub portion 852, the inner race 781, and the hub portion 732 axially against the shoulder portion 726.

In various embodiments, the resistance member 850 may include a body 851 having any of various shapes. In some embodiments, the body 851 may have a disk shape. In some embodiments, the body 851 may have a substantially flat circular disk shape. In some embodiments, the body 851 may include an inner radial portion 854 connected to an outer radial portion 858 by a frusto-conical intermediate portion 856. Advantageously, this may impart stiffness to the body 851 of the resistance member. Moreover, this may increase the effective surface area of the resistance member 850 in contact with the viscous fluid. Additionally, this may result in the viscous drive assembly 800 being more compact, and the clutch device 700 having a smaller size.

In various embodiments, the body 851 of the resistance member 850 may include one or more holes (similar to those shown with respect to resistance member 450 in FIG. 9). The one or more holes may allow fluid to flow between the two sides of the resistance member 850 to equalize the fluid level and/or the fluid pressure on each side. In some embodiments, the body 851 of the resistance member 850 may include slots, curves, surface treatments, or other geometrical features that may aid in fluid dispersion or fluid movement.

In some embodiments, the body 851 of the resistance member 850 may have an average axial thickness of between 0.05 and 0.12 inches. In other embodiments, the body 851 may have an average axial thickness of 0.05 inches or less. In still other embodiments, the body 851 may have an average axial thickness of between 0.08 and 0.25 inches. In still other embodiments, the body 851 may have an axial thickness of 0.25 inches or more. In still other embodiments, the body 851 may have an average axial thickness of between 0.1 inches and 0.15 inches.

In some embodiments, the resistance member 850 may have an outer diameter of between 3 and 6 inches. In still other embodiments, the resistance member 850 may have an outer diameter of 3 inches or less. In still other embodiments, the resistance member 850 may have an outer diameter of 6 inches or more. In still other embodiments, the resistance member 850 may have an outer diameter of between 4 and 5 inches.

Still referring to FIGS. 7 and 8, in some embodiments, the viscous fluid may surround a portion of the resistance member 850 in the viscous chamber 810. In some embodiments, the viscous fluid may be an oil, such as hydraulic oil. In other embodiments, the viscous fluid may be a heat-sensitive material, such as a silicone gel, that may thicken or expand under heated conditions. Still referring to FIGS. 7 and 8, a rear wiper seal 842 and a front wiper seal 844 may be disposed on opposite sides of the viscous chamber 810.

Still referring to FIGS. 7 and 8, in some embodiments, the viscous chamber 810 may be disposed in an interior portion of the input member 710. In some embodiments, the viscous chamber 810 may be substantially defined by a space between surfaces of the input member 710 and a rear cover 830. The viscous chamber 810 may include a radially inward portion 812 and a radially outward portion 816. One or more screws (not shown) may attach the rear cover 830 to the input member 710.

In accordance with an embodiment, the viscous fluid may provide a torque transfer between the input member 710 and the resistance member 850. A rotation of the input member 710 may impart a shearing force on the viscous fluid. The viscous fluid in a rear portion 813 of the viscous chamber 810 between the rear cover 830 and the resistance member 850 may transfer the shearing force between the rear cover 830 and the resistance member 850. Likewise, the viscous fluid in a front portion 815 of the viscous chamber 810 between the resistance member 850 and the input member 710 may transfer the shearing force between the input member 710 and the resistance member 850. This may result in a torque on the central shaft 720 to which the resistance member 850 may be rotationally coupled, and from the central shaft 720 to the output member 750 to which the central shaft may be rotationally coupled. Thus, the viscous drive assembly 800 according to an embodiment may provide a torque transfer from the input member 710 to the output member 750, thereby causing the output member 750 to rotate at the second speed when the input member 710 is driven to rotate at the first speed. Advantageously, according to some embodiments, with the resistance member 850 disposed in the viscous chamber 810, the effective surface area of the viscous drive assembly 800 in contact with the viscous fluid, and thus, the available torque transfer at the second speed, may be substantially greater than in other clutch devices.

In various embodiments, the second speed may be changed by altering one or more of the following: the viscosity of the viscous fluid, the amount of viscous fluid provided in the viscous chamber 810, the geometry of the rear cover 830, the geometry of the input member 710, the size of the space between the rear cover 830 and the resistance member 850, and the size of the space between the resistance member 850 and the input member 710. In some embodiments, one or more surfaces of the resistance member 850, the rear cover 830, or the input member 710 may have a greater effective surface area due to the presence of various patterns or shapes, thereby increasing the contact area with the viscous fluid.

Advantageously, the viscous drive assembly 800 may be substantially contained within the input member 710. Accordingly, in some embodiments of the fan clutch system 30, the viscous drive assembly 800 may remain entirely intact even when the clutch device 700 is removed from the drive member 100. This may reduce the cost and/or complexity of performing repairs.

Moreover, in some embodiments, the viscous chamber 810 may have a constant volume. Accordingly, the clutch device 700 may undergo reduced wear and may thus have an increased service life compared to other clutch devices.

Thus, according to various embodiments, the clutch device 700 may provide torque transfer to rotate the output member 750 at the first speed when the friction drive assembly 770 is in the engaged position and to rotate the output member 750 at the second speed when the friction drive assembly 770 is in the disengaged position.

In some instances, it may be desirable to vary the second speed, for example, where an amount of cooling greater or smaller than that provided by a fan clutch system output rotating at the second speed is desired. In an embodiment, the 2-speed clutch device 300 in the fan clutch system 10, as shown in FIG. 1, above, may be installed in a truck to provide cooling airflow to a radiator. In such an embodiment, the clutch device 300 may have a second speed of 300 RPM. When even less airflow is required, for example, when the ambient air is cold, such as may occur during the winter, it may be desirable to further reduce the second speed below 300 RPM. Alternatively, when the second speed is too low, it may be desirable to increase the second speed while staying below the first speed. However, in some embodiments, the viscous drive assembly 400 may have a second speed that is effectively fixed.

Advantageously, by reducing the amount of viscous fluid in the viscous drive assembly 400, the torque transfer through the viscous drive assembly 400—and thus the second speed—may be reduced. Alternatively, by increasing the amount of viscous fluid in the viscous drive assembly 400, the torque transfer through the viscous drive assembly 400—and thus the second speed—may be increased. Accordingly, in a variable viscous system, by selectively controlling the amount of viscous fluid in the viscous drive assembly 400, the second speed may be varied.

Figure 10:
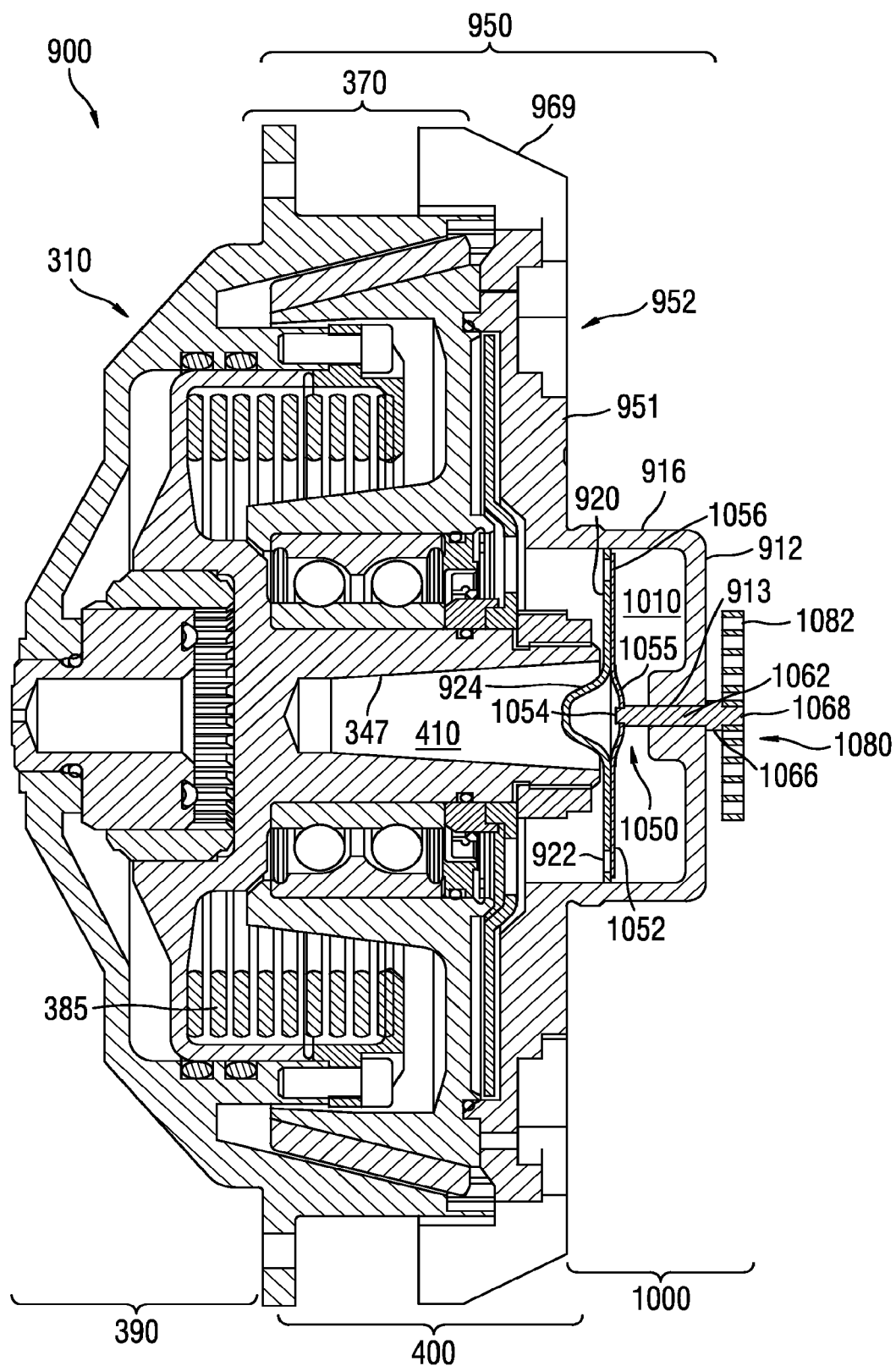
FIG. 10 is a cutaway side view of a clutch device in accordance with still another embodiment.
Figure 11:
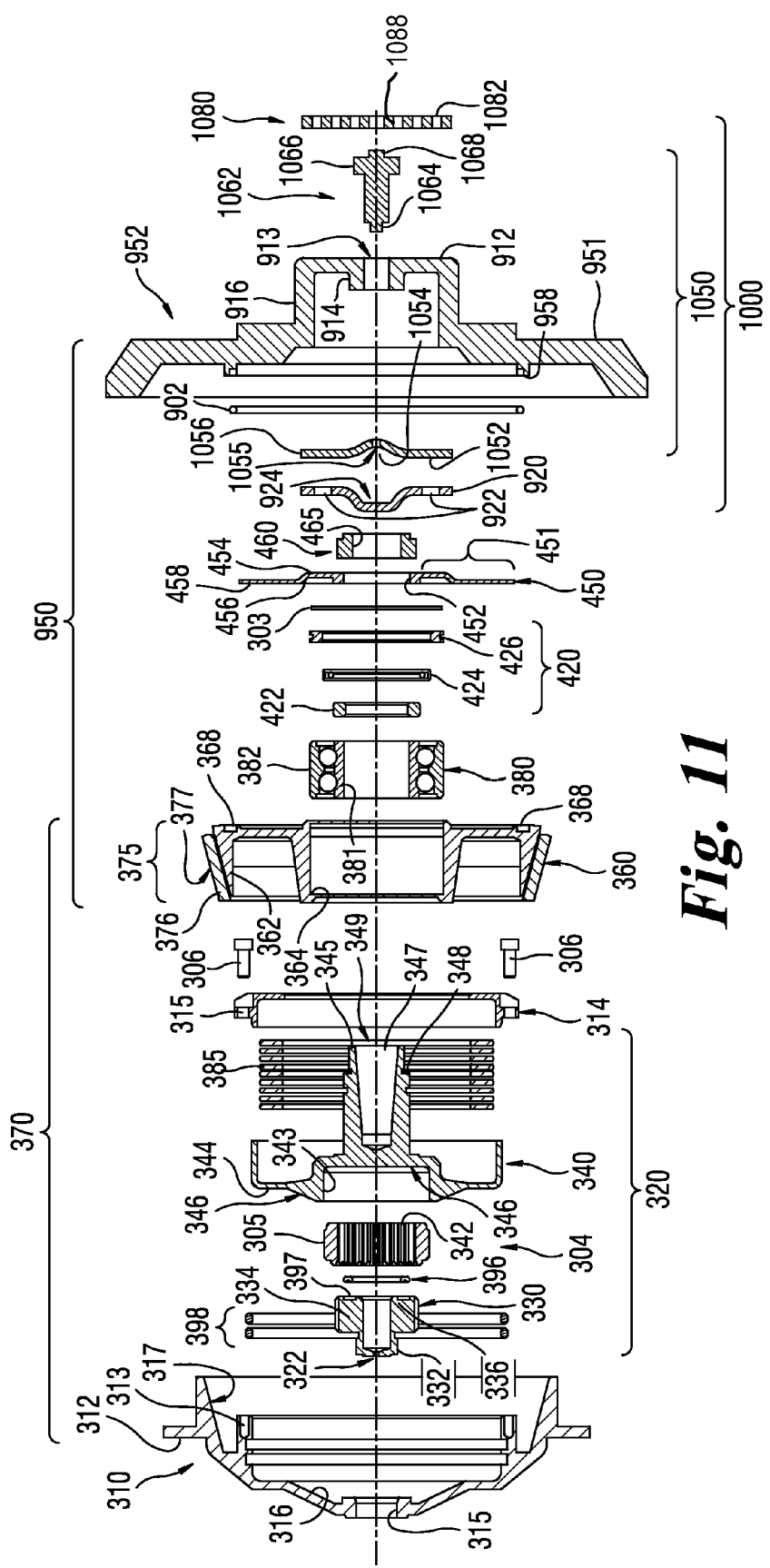
FIG. 11 is an exploded cutaway side view of a clutch device in accordance with the still another embodiment.

Referring now to FIGS. 10 and 11, some embodiments of a clutch device 900 with a variable viscous system may include a variable viscous fluid supply assembly 1000, wherein the second speed may be varied during operation of the clutch device 900 by varying the amount of viscous fluid in the viscous drive assembly 400. According to some embodiments, it may be possible to modify the clutch device 300 of FIGS. 3 and 4 by installing the variable viscous fluid supply assembly 1000 on the clutch device 300, thereby forming the clutch device 900. Advantageously, upgrading the clutch device 300 to include the variable viscous fluid supply assembly 1000 may be comparatively convenient and inexpensive inasmuch as only certain parts of the clutch device 300 are replaced, while other parts are retained.

Thus, as shown in FIGS. 10 and 11, the clutch device 900 may include the input member 310, the central shaft 320, an output member 950, the friction drive assembly 370, the biasing member 385, the fluid actuator assembly 390, the viscous drive assembly 400, and the variable viscous fluid supply assembly 1000. In like manner as discussed above with respect to FIGS. 1-4, the input member 310 may rotate about the axis 105 at the first speed when driven by the drive device 100 of a fan clutch system 40 including the clutch device 900. In like manner to other embodiments discussed above, the output member 950 may receive an output device, for example, a fan blade device, on an output device mounting portion 952 of the output member 950.

In the clutch device 900, the input member 310, the central shaft 320, the friction drive assembly 370, the biasing member 385, and the fluid actuator assembly 390 may have substantially the same structures and functions described above with respect to FIGS. 1-4. In some embodiments, the output member 950 may include a front plate 951 attached to the intermediate member 360, for example, by one or more screws. In some embodiments, the front plate 951 may include a ridge 958 that mates with the recess 368 in the intermediate member 360. The ridge 958 and the recess 368 may have corresponding shapes, thereby providing a tight seal. In some embodiments, a seal member 902, such as an o-ring seal, may be provided between the front plate 951 and the intermediate member 360. The output member may include one or more heat dissipation portions 969 to dissipate heat arising from the frictional and fluidic engagement of the friction drive assembly 370 and the viscous drive assembly 400.

Figure 12:
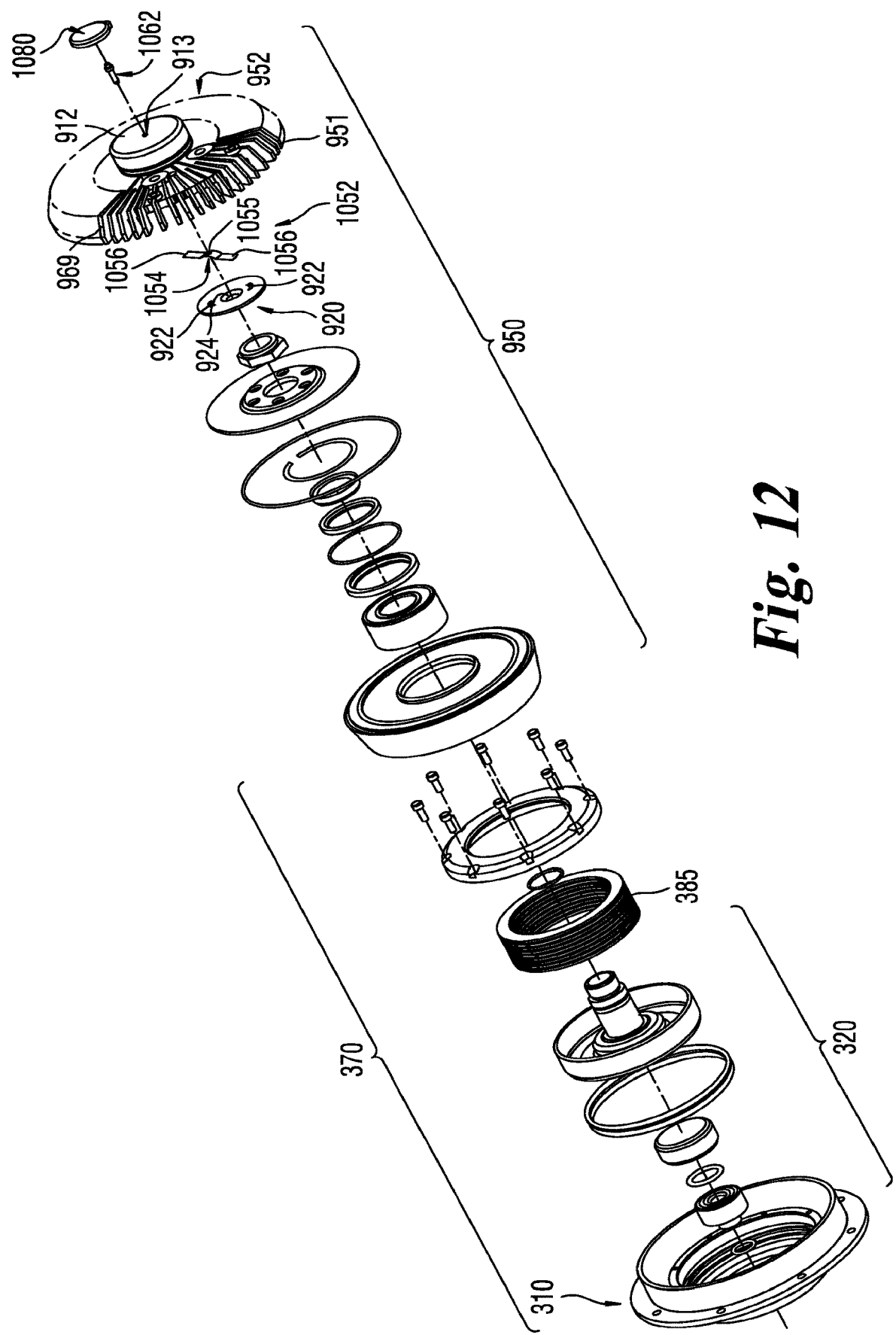
FIG. 12 is an exploded perspective view of a clutch device in accordance with the still another embodiment.

Referring to FIGS. 10-12, the viscous drive assembly 400 may include the viscous fluid disposed in the viscous chamber 410, and the resistance member 450 disposed in the viscous chamber 410. The viscous drive assembly 400 may fluidically couple the input member 310 to the output member 950 so that the output member 950 rotates at the second speed slower than the first speed when the friction drive assembly 370 is in the disengaged position. In some embodiments, the resistance member 450 is fixed to rotate with the central shaft 320.

The viscous fluid supply assembly 1000 may include the viscous fluid disposed in a viscous fluid storage chamber 1010, a viscous fluid supply valve 1050 disposed between the viscous fluid storage chamber 1010 and the viscous chamber 410, and a viscous valve actuator 1080 that controls the operation of the viscous fluid supply valve 1050.

Referring to FIGS. 10-12, in some embodiments, the viscous fluid storage chamber 1010 may be disposed in a forward portion of the front plate 951. In other embodiments, the viscous fluid storage chamber may be disposed elsewhere.

Referring to FIG. 10, the viscous fluid storage chamber 1010 may be formed by a front wall portion 912, a sidewall portion 916 of the front plate 951, and a partition wall 920. In some embodiments, the front wall portion 912 may have the shape of a flat disk.

Referring again to FIGS. 10-12, in some embodiments, the sidewall portion 916 of the front plate 951 may have the shape of a cylinder. In some embodiments, the partition wall 920 may have the shape of a substantially flat disk. The partition wall 920 may act as a chamber divider that separates the viscous chamber 410 from the viscous fluid storage chamber 1010.

Referring to FIG. 10, a valve-shaft-receiving hole 913 may extend through the front wall portion 912 into the viscous fluid storage chamber 1010. The front wall portion 912 may include a shaft-supporting portion 914 to support a valve shaft 1062, as discussed below.

According to various embodiments, the partition wall 920 may form an axially rearward side of the viscous fluid storage chamber 1010, separating the viscous fluid storage chamber 1010 from the viscous chamber 410. In some embodiments, the partition wall 920 may be fixed to interior surfaces of the sidewall portion 916, for example by welding, brazing, or soldering. In other embodiments, the partition wall 920 may be formed by molding or fixed by press-fitting or snap-fitting to the sidewall portion 916.

Referring to FIGS. 10-12, in various embodiments, the partition wall 920 may include a cup portion 924 that extends the axially rearward side of the viscous fluid storage chamber 1010 in the axially rearward direction. The cup portion 924 may allow the volume of the viscous fluid storage chamber 1010 to be increased, thereby enabling a greater range of variations of the viscous fluid level in the viscous chamber 410. In some embodiments, the cup portion 924 may have a shape corresponding to the shape of the cup portion 347. Accordingly, the volume of the viscous chamber 410 may be increased while maintaining a compact arrangement on the forward end of the clutch device 900.

Referring to FIGS. 10-12, one or more viscous fluid supply holes 922 may extend through the partition wall 920, thereby providing fluid communication through the partition wall 920 between the viscous fluid storage chamber 1010 and the viscous chamber 410.

Still referring to FIGS. 10-12, the viscous fluid supply valve 1050 may include a valve plate 1052 and a valve shaft 1062. In various embodiments, the valve plate 1052 may be disposed in one or both of the viscous fluid storage chamber 1010 and the viscous chamber 410.

Referring to FIG. 10, the valve plate 1052 may abut the partition wall 920 in the axial direction such that in a closed position of the viscous fluid supply valve 1050, the valve plate 1052 covers the one or more viscous fluid supply holes 922 and in an open position of the fluid supply valve 1050, the valve plate 1052 does not cover the one or more viscous fluid supply holes 922. The valve plate 1052 may include a shaft attachment portion 1054 whereby the valve plate 1052 attaches to the valve shaft 1062. In various embodiments, the valve plate 1052 may have the shape of a disk or of a portion of a disk. In some embodiments, the valve plate 1052 may include one or more radial extensions 1056 extending toward the radial edge of the partition wall 920.

Still referring to FIGS. 10-12, the valve shaft 1062 may have a generally elongate shape. A first end of the valve shaft 1062 may include a plate attachment portion 1064 whereby the valve shaft 1062 attaches to the valve plate 1052 so that the valve shaft 1062 and the valve plate 1052 rotate together about the longitudinal axis of the valve shaft. In some embodiments, the valve attachment portion 1054 and the plate attachment portion 1064 may be formed as interlocking threaded portions. In other embodiments, a fastener such as a locknut may be used to securely attach the valve plate 1052 to the valve shaft 1062. In still other embodiments, the valve plate 1052 may be attached to the valve shaft 1062 by snap fitting, press fitting, rolling, or another means in which a separate fastener is not required, to enable speedy assembly while reducing space requirements. Some embodiments of the valve plate 1052 may include an offset portion 1055 radially between the shaft attachment portion 1054 and the one or more radial extensions 1056. The offset portion 1055 may form a recess to provide clearance, facilitating attachment of the valve plate 1052 to the valve shaft 1062.

The valve shaft 1062 may include an actuator attachment portion 1068 on the end opposite the plate attachment portion 1064. The valve shaft 1062 may include a bearing portion 1066 between the plate attachment portion 1064 and the actuator attachment portion 1068.

In various embodiments, the valve shaft 1062 may extend through the hole 913 in the front wall portion 912 of the front plate 951. The shaft-supporting portion 914 included in the front wall portion 912 may help align and support the valve shaft 1062 in the hole 913. In various embodiments, the valve shaft 1062 may be retained in the hole 913 by a snap ring mated to a groove in the valve shaft 1062. In other embodiments, the valve shaft 1062 may include a shoulder portion that retains the valve shaft 1062 in the axial direction against the shaft-supporting portion 914. Various embodiments may include one or more o-rings or other sealing devices to seal the viscous fluid from leaking through the hole 913.

In various embodiments, the valve plate 1052 may pivotally abut the partition wall 920 to rotate in relation to the partition wall 920 about a pivot point formed by the intersection of the valve shaft 1062 with the valve plate 1052. The one or more viscous fluid supply holes 922 in the partition wall 920 may be radially spaced apart from the pivot point so that as the valve plate rotates, the one or more fluid supply holes 922 are covered or uncovered by the one or more radial extensions 1056 of the valve plate 1052. The shape of the one or more supply holes 922 may also have different geometries to vary a flow rate of the viscous fluid into the viscous chamber 410 as the valve plate 1052 rotates. Advantageously, the one or more fluid supply holes 922 may be provided with a particular geometry, to permit a rate of fluid release to be increased or decreased in a predetermined manner. In some embodiments, an initial opening of the one or more fluid supply holes 922 may be kept small to allow for minimal fluid release at lower temperatures, while the opening may increase exponentially as the valve plate 1052 continues to open to allow a greater amount of the viscous fluid to flow into the viscous chamber 410. In an embodiment, the one or more fluid supply holes 922 may be wedge shaped. In other embodiments, the one or more fluid supply holes 922 may have another shape.

Referring again to FIG. 10, advantageously, arranging the variable viscous drive assembly 1000 with the viscous valve actuator 1080 disposed on a forward end of the clutch device 900 may provide a compact configuration that is easily serviceable.

Still referring to FIGS. 10-12, in some embodiments, the viscous valve actuator 1080 may be disposed on a forward side of the front wall portion 912 of the front plate 951. In some embodiments, the viscous valve actuator 1080 may be thermally-activated to control the rotation of the valve shaft 1062 based on a temperature or based on a change in temperature. In other embodiments, the viscous valve actuator 1080 may be controlled by other means, such as a manual switch. In still other embodiments, the viscous valve actuator 1080 may be controlled by an electronic controller or by an electrical controller based on an input from a sensor, such as a thermistor.

Referring to FIGS. 10-12, the viscous valve actuator 1080 may include a bimetal coil 1082 whereby changes in temperature are converted into an axial rotation of the coil 1082 by disparate thermal expansions of the two metals comprising the bimetal coil 1082. A shaft attachment portion 1088 of the viscous valve actuator 1080 may be attached at the actuator attachment portion 1068 of the valve shaft 1062 so as to cause the valve shaft 1062 to rotate with the axial rotation of the bimetal coil 1082. In various embodiments, the bimetal coil 1082 may be enclosed in a protective housing.

According to various embodiments, the viscous valve actuator 1080 may be calibrated to open and close the viscous fluid supply valve 1050 at predetermined temperatures. In embodiments including the bimetal coil 1082, the viscous valve actuator 1080 may be calibrated by applying a predetermined strain on the coil 1082. In embodiments including an electrical or electronic controller, calibration and control values may be determined based on a combination of electrical elements arranged in a circuit.

Figure 13:
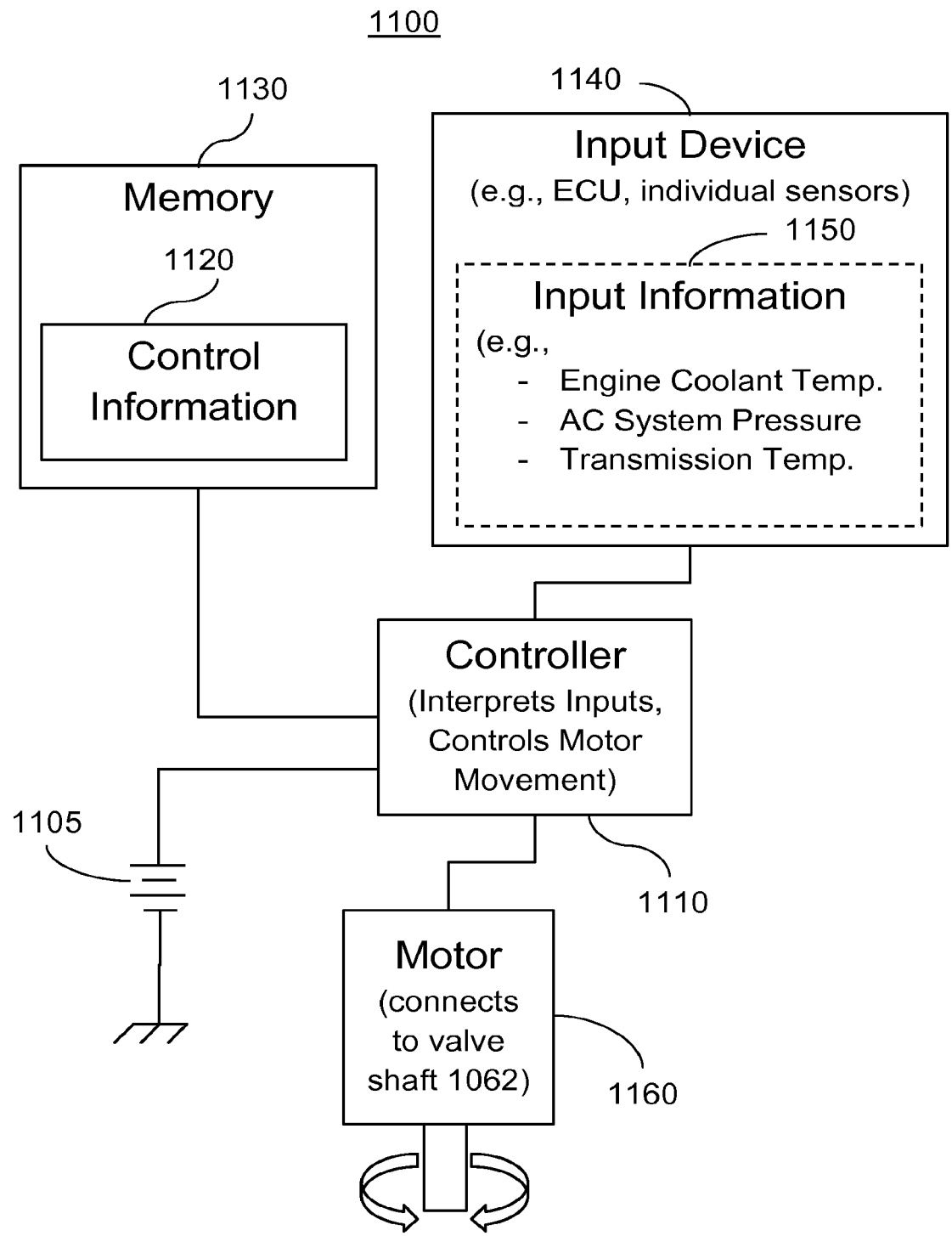
FIG. 13 is a diagrammatic view of a valve control system in accordance with various embodiments.

Referring now to FIG. 13, some embodiments may include a valve control system 1100 including an electronic controller 1110 supplied with power from a power supply 1105. In some embodiments, control information 1120 may be stored in a memory 1130. In some embodiments, various input devices 1140 may provide the controller 1110 with input information 1150 to control a motor 1160 that drives the valve shaft 1062. In some embodiments, the input information 1150 may include one or more of an engine coolant temperature, an air conditioning system pressure, a transmission temperature, or other inputs. Accordingly, a cooling effect of a fan driven by the clutch device 900 may be made responsive to any of various inputs.

In various embodiments, the control information 1120 may be provided as one or more look-up tables corresponding to the input information 1150. In some embodiments, the memory 1130 may be a non-volatile storage medium. In various embodiments, the memory 1130 may include one or more of a ROM, an EPROM, a flash memory device, or another non-transitory computer-readable storage medium.

In various embodiments, the input device 1140 may include an ECU, individual sensors, or other transducers. Accordingly, in come embodiments, the input information 1150 may be provided to the controller 1110 as a signal from an ECU. In some embodiments, the input information 1150 may be provided as one or more signals from one or more individual sensors. According to some embodiments, one or more portions of the valve control system 1100 may be comprised in a vehicle ECU, while in other embodiments, one or more portions of the valve control system 1100 may separate from a vehicle ECU. In some embodiments, the memory 1130 may be integral to the controller 1110. In other embodiments, the memory 1130 may be accessible to the controller via a bus.

In various embodiments, the motor 1160 may be an electric motor, a pneumatic motor, a hydraulic motor, or another kind of motor or driving device for providing a controlled angular rotation to the valve shaft 1062.

Figure 14:
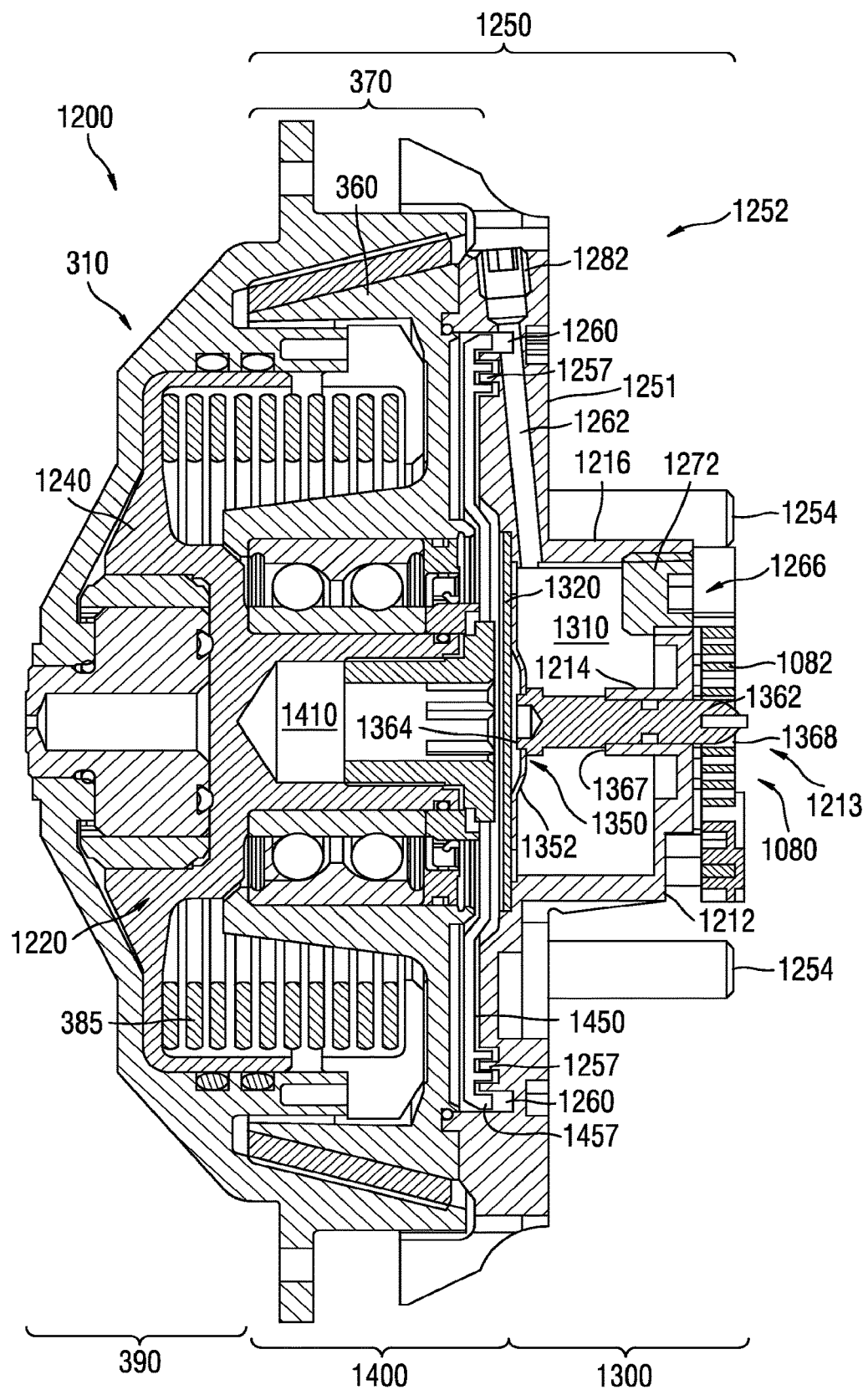
FIG. 14 is a cutaway side view of a clutch device in accordance with a further embodiment.

Referring now to FIG. 14, some embodiments of a clutch device 1200 with a variable viscous system may include a variable viscous fluid supply assembly 1300, wherein the second speed may be varied during operation of the clutch device 1200 by varying the amount of viscous fluid in a viscous drive assembly 1400. According to some embodiments, it may be possible to modify the clutch device 300 of FIGS. 3 and 4 by installing the variable viscous fluid supply assembly 1300 on the clutch device 300, thereby forming the clutch device 1200. Advantageously, upgrading the clutch device 300 to include the variable viscous fluid supply assembly 1300 may be comparatively convenient and inexpensive inasmuch as only certain parts of the clutch device 300 are replaced, while other parts are retained.

Thus, as shown in FIG. 14, the clutch device 1200 may include the input member 310, a central shaft 1220, an output member 1250, the friction drive assembly 370, the biasing member 385, the fluid actuator assembly 390, the viscous drive assembly 1400, and the variable viscous fluid supply assembly 1300. In like manner as discussed above with respect to FIGS. 1-4, the input member 310 may rotate about the axis 105 at the first speed when driven by the drive device 100 of a fan clutch system 40 including the clutch device 1200. In like manner to other embodiments discussed above, the output member 1250 may receive an output device, for example, a fan blade device, on an output device mounting portion 1252 of the output member 1250. Some embodiments may include mounting studs 1254 for mounting an output device.

In the clutch device 1200, the input member 310, the friction drive assembly 370, and the biasing member 385 may have substantially the same structures and functions described above with respect to FIGS. 1-4. In some embodiments, the output member 1250 may include a front plate 1251 attached to an intermediate member 360, for example, by one or more screws.

Referring to FIG. 14, the viscous drive assembly 1400 may include the viscous fluid disposed in a viscous chamber 1410, and a resistance member 1450 disposed in the viscous chamber 1410. The viscous drive assembly 1400 may fluidically couple the input member 310 to the output member 1250 so that the output member 1250 rotates at the second speed slower than the first speed when the friction drive assembly 370 is in the disengaged position. In some embodiments, the resistance member 1450 is fixed to rotate with the central shaft 1220, which includes a piston 1240 which operates in substantially similar manner to the piston 340.

In some embodiments, a ring-shaped channel 1260 may be formed in a rear face of the front plate 1251, toward a radially-outward portion of the viscous chamber 1410. As the resistance member 1450 rotates in the viscous chamber 1410, the viscous fluid may tend to flow into the ring-shaped channel 1260, due to centrifugal action.

In some embodiments, the resistance member 1450 may include one or more grooves and rings 1457 that overlap with corresponding grooves and rings 1257 in an adjacent surface of the output member 1250. As the resistance member 1450 rotates in the viscous chamber 1410, the viscous fluid may tend to flow between the grooves and rings 1457, 1257, thereby enhancing the torque transfer between resistance member 1450 and the output member 1250.

The viscous fluid supply assembly 1300 may include the viscous fluid disposed in a viscous fluid storage chamber 1310, a viscous fluid supply valve 1350 disposed between the viscous fluid storage chamber 1310 and the viscous chamber 1410, and the viscous valve actuator 1080 that controls the operation of the viscous fluid supply valve 1050.

Referring to FIG. 14, the viscous fluid storage chamber 1310 may be formed by a front wall portion 1212, a sidewall portion 1216 of the front plate 1251, and a partition wall 1320. In some embodiments, the front wall portion 1212 may have the shape of a flat disk.

In some embodiments, the sidewall portion 1216 of the front plate 1251 may have the shape of a cylinder. In some embodiments, the partition wall 1320 may have the shape of a substantially flat disk. The partition wall 1320 may act as a chamber divider that separates the viscous chamber 1410 from the viscous fluid storage chamber 1310.

Still referring to FIG. 14, a valve-shaft-receiving hole 1213 may extend through the front wall portion 1212 into the viscous fluid storage chamber 1310. The front wall portion 1212 may include a shaft-supporting portion 1214 to support the valve shaft 1362, as discussed below.

According to some embodiments, the partition wall 1320 may form an axially rearward side of the viscous fluid storage chamber 1310, separating the viscous fluid storage chamber 1310 from the viscous chamber 1410. In some embodiments, the partition wall 1320 may be fixed to interior surfaces of the sidewall portion 1216, for example by welding, brazing, or soldering. In other embodiments, the partition wall 1320 may be formed by molding or fixed by press-fitting or snap-fitting to the sidewall portion 1216.

Referring to FIG. 14, in some embodiments, one or more viscous fluid supply holes may extend through the partition wall 1320 in substantially similar fashion as discussed above with respect to the viscous fluid supply holes 922 of the partition wall 920.

The viscous fluid supply valve 1350 may include a valve plate 1352 and a valve shaft 1362. In various embodiments, the valve plate 1352 may be disposed in one or both of the viscous fluid storage chamber 1310 and the viscous chamber 1410.

The valve plate 1352 may abut the partition wall 1320 in the axial direction such that in a closed position of the viscous fluid supply valve 1350, the valve plate 1352 covers the one or more viscous fluid supply holes and in an open position of the fluid supply valve 1350, the valve plate 1352 does not cover the one or more viscous fluid supply holes.

The valve shaft 1362 may have a generally elongate shape attached to the valve plate 1352 so that the valve shaft 1362 and the valve plate 1352 rotate together about the longitudinal axis of the valve shaft 1362, in substantially similar fashion as the valve plate 1052 and the valve shaft 1062. The valve shaft 1362 may include an actuator attachment portion 1368.

In various embodiments, the valve shaft 1362 may extend through the hole 1213 in the front wall portion 1212 of the front plate 1251. The shaft-supporting portion 1214 included in the front wall portion 1212 may help align and support the valve shaft 1362 in the hole 1213. In various embodiments, the valve shaft 1362 may be retained in the hole 1213 by a snap ring mated to a groove in the valve shaft 1362. In other embodiments, the valve shaft 1362 may include a shoulder portion 1367 that retains the valve shaft 1362 in the axial direction against the shaft-supporting portion 1214. Various embodiments may include one or more o-rings or other sealing devices to seal the viscous fluid from leaking through the hole 1213.

In some embodiments, the front plate 1251 may include an opening 1266 through which the viscous fluid may be inserted into or removed from the viscous chamber 1410. A cap 1272 may be provided to seal the opening to prevent the viscous fluid from escaping from the viscous fluid storage chamber 1310.

Still referring to FIG. 14, a return passage 1262 may connect the ring-shaped channel 1260 with the viscous fluid storage chamber 1310. The return passage 1262 may provide a path for viscous fluid in the viscous chamber 1410 to return to the viscous fluid storage chamber 1310. As discussed above, as the resistance member 1450 rotates in the viscous chamber 1410, the viscous fluid may tend to flow into the ring-shaped channel 1260, due to centrifugal action. Viscous fluid collected in the ring-shaped channel 1260 may tend to be forced through the return passage 1262 back into the viscous fluid storage chamber 1310 due to a difference in pressure.

In various embodiments, if the viscous fluid supply valve 1350 remains open, the viscous fluid will continuously circulate between the viscous fluid storage chamber 1310 and the viscous chamber 1410, such that when the viscous fluid supply valve 1350 is closed, the viscous fluid will continue to fill the viscous fluid storage chamber 1310 until the viscous chamber 1410 is effectively empty. Accordingly, the response of the clutch device 1200 may be controlled by adjusting the position of the viscous fluid supply valve 1350. According to some embodiments, an effective diameter of the return passage 1262 may be calibrated to control a return flow rate of the viscous fluid through the return passage 1262. Accordingly, the response of the clutch device 1200 may be further controlled by adjusting an effective diameter of the return passage 1262.

In some embodiments, the return passage 1262 may be capped by a plug 1282 that seals an opening of the return passage 1262 to prevent the viscous fluid from escaping from the return passage 1262. Advantageously, according to some embodiments, the return passage 1262 may be conveniently formed by a material removal process, such as drilling. In this manner, expensive or complex cast parts may be avoided.

Obviously, numerous modifications and variations of the present invention are possible in light of the above teachings. It is therefore to be understood that within the scope of the appended claims, the invention may be practiced otherwise than as specifically described herein. For instance, features disclosed with respect to one embodiment may be combined with features of other embodiments.

The invention claimed is:

1. A fan clutch system, comprising:
an input member;
a central shaft comprising a fluid inlet portion;
an output member comprising a mounting portion for mounting a fan blade device; and
an automated viscous drive system comprising
a viscous drive assembly fluidically coupling the input member to the output member such that the viscous drive assembly drives rotation of the output member, wherein
a proximal end of the viscous drive assembly is adapted to attach to the mounting portion, and
a distal end of the viscous drive assembly is opposite the proximal end and proximate the mounted fan blade device, the viscous drive assembly comprising
a viscous chamber for holding a volume of viscous fluid, the viscous chamber disposed within the output member along a longitudinal axis between the proximal end and the distal end of the viscous drive assembly, and
a resistance member disposed within the viscous chamber, wherein the resistance member rotates with the central shaft about the longitudinal axis of the viscous drive assembly to impart a shearing force on the viscous fluid that transfers torque from the resistance member to the output member;
a variable viscous fluid supply assembly comprising
a viscous fluid storage chamber positioned distally to the viscous chamber, and
a valve means disposed between the viscous chamber and the viscous fluid storage chamber such that fluid communication between the viscous chamber and the viscous fluid storage chamber is permitted when the valve means is in an open position and restricted when the valve means is in a closed position, and
a viscous valve actuation means that drives the valve means to move between the open position and the closed position, the viscous valve actuation means including
a controller comprising a digital memory storing control information for the viscous valve actuation means and control circuitry configured to
receive input information from at least one input device, and
control operation of the valve means based on the control information and the received input information.

2. The fan clutch system of claim 1, wherein the controller is separate from a vehicle electronic control unit.

3. The fan clutch system of claim 1, wherein the at least one input device includes at least one of a temperature sensor or a pressure sensor.

4. The fan clutch system of claim 1, wherein the input information includes at least one of an engine coolant temperature, an air conditioning system pressure, or a transmission temperature.

5. The fan clutch system of claim 1, wherein:
the viscous chamber is formed in part by a chamber divider at a distal end of the viscous chamber separating the viscous chamber from the viscous fluid storage chamber; and
the valve means comprises a plate abutting a surface of the chamber divider such that
in the closed position of the valve means, the plate covers one or more openings in the chamber divider, and
in the open position of the valve means, the plate does not cover the one or more openings.

6. The fan clutch system of claim 5, wherein the plate abuts a distal surface of the chamber divider.

7. The fan clutch system of claim 5, wherein the valve means comprises a valve shaft, wherein the viscous valve actuation means causes axial rotation of the valve shaft about the longitudinal axis of the viscous drive assembly.

8. The fan clutch system of claim 7, wherein the valve shaft comprises a plate attachment portion at a first end of the valve shaft for attaching the plate to the valve shaft, wherein the axial rotation of the valve shaft causes a corresponding axial rotation of the plate to move the valve means between the open and closed positions.

9. The fan clutch system of claim 7, wherein the valve shaft comprises an actuator attachment portion for engaging the viscous valve actuation means, wherein
the actuator attachment portion is disposed at a second end of the valve shaft opposite the first end.

10. The fan clutch system of claim 1, wherein the control information stored in the digital memory comprises at least one look-up table, wherein
the at least one look-up table includes control information for the viscous valve actuation means based in part on the received input information from the at least one input device.

11. The fan clutch system of claim 10, wherein the control information for the viscous valve actuation means is based in part on calibration data for the control circuitry of the controller.

12. The fan clutch system of claim 1, wherein the viscous valve actuation means comprises a motor for driving the valve means to move between the open position and the closed position.

13. The fan clutch system of claim 12, wherein the motor is an electric motor, a pneumatic motor, or a hydraulic motor.

14. The fan clutch system of claim 1, wherein the resistance member comprises a disk portion extending radially outward from the longitudinal axis of the viscous drive assembly.

15. The fan clutch system of claim 14, wherein the resistance member comprises a plurality of holes arranged on a surface of the disk portion to permit a portion of the viscous fluid to contact a first surface of the disk portion facing the proximal end of the viscous drive assembly and a second surface of the disk portion facing the distal end of the viscous drive assembly.

16. A fan clutch system, comprising:
an input member;
a central shaft including a fluid inlet portion;
an output member comprising a mounting portion for mounting a fan blade device; and
an automated viscous drive system comprising
a viscous drive assembly fluidically coupling the input member to the output member such that the viscous drive assembly drives rotation of the output member, wherein
a proximal end of the viscous drive assembly is adapted to attach to the mounting portion, and
a distal end of the viscous drive assembly is opposite the proximal end and proximate the mounted fan blade device, the viscous drive assembly comprising
a viscous chamber for holding a volume of viscous fluid, the viscous chamber disposed within the output member along a longitudinal axis between the proximal end and the distal end of the viscous drive assembly,
a resistance member disposed within the viscous chamber, wherein the resistance member rotates with the central shaft about the longitudinal axis of the viscous drive assembly to impart a shearing force on the viscous fluid that transfers torque from the resistance member to the output member, and
a variable viscous fluid supply assembly comprising
a viscous fluid storage chamber positioned distally to the viscous chamber,
a valve means disposed between the viscous chamber and the viscous fluid storage chamber such that fluid communication between the viscous chamber and the viscous fluid storage chamber is permitted when the valve means is in an open position and restricted when the valve means is in a closed position, and
a valve actuator that selectively drives the valve means to move between the open position and the closed position, the valve actuator comprising
means for automatically driving the valve means between the open position and the closed position.

17. The fan clutch system of claim 16, wherein the means for automatically driving the valve means between the open position and the closed position comprises:
a motor for driving the valve means to move between the open position and the closed position; and
a controller comprising
a digital memory storing control information for the motor, and
control circuitry configured to
receive input data from the at least one input device, and
control operation of the motor based on the control information and the received input data.

18. The fan clutch system of claim 17, wherein a vehicle electronic control unit comprises the controller.

19. The fan clutch system of claim 16, wherein the means for automatically driving the valve means between the open position and the closed position comprises a thermally-activated device to drive the valve means between the open position and the closed position based on a temperature.

20. The fan clutch system of claim 19, wherein the thermally-activated device comprises a bimetal coil to convert a change in temperature into an axial rotation of a shaft of the valve means.

* * * * *